(12) United States Patent
Tabata et al.

(10) Patent No.: US 9,132,829 B2
(45) Date of Patent: Sep. 15, 2015

(54) CONTROL DEVICE FOR VEHICLE DRIVE DEVICE

(75) Inventors: Atsushi Tabata, Okazaki (JP); Tatsuya Imamura, Okazaki (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 0 days.

(21) Appl. No.: 14/129,442

(22) PCT Filed: Jun. 29, 2011

(86) PCT No.: PCT/JP2011/064986
§ 371 (c)(1),
(2), (4) Date: Dec. 26, 2013

(87) PCT Pub. No.: WO2013/001633
PCT Pub. Date: Jan. 3, 2013

(65) Prior Publication Data
US 2014/0156129 A1 Jun. 5, 2014

(51) Int. Cl.
*B60W 20/00* (2006.01)
*B60K 6/48* (2007.10)
*B60K 6/547* (2007.10)
*B60W 10/06* (2006.01)
(Continued)

(52) U.S. Cl.
CPC .............. *B60W 20/10* (2013.01); *B60K 6/48* (2013.01); *B60K 6/547* (2013.01); *B60W 10/023* (2013.01); *B60W 10/06* (2013.01); *B60W 10/08* (2013.01); *B60W 10/115* (2013.01); *B60W 20/00* (2013.01); *B60W 30/1882* (2013.01);
(Continued)

(58) Field of Classification Search
CPC ........... Y02T 10/6286; Y02T 10/6221; B60W 10/023; B60W 20/10; B60W 10/115; B60W 20/00; B60W 30/1882; B60W 2710/0644; B60W 2710/0666; B60W 2710/083; Y01S 903/93; B60K 6/48; B60K 6/547; B60K 10/06; B60K 10/08
USPC ......................... 701/22; 903/930; 180/65.265
See application file for complete search history.

(56) References Cited

U.S. PATENT DOCUMENTS 5,779,595 A * 7/1998 Kono et al. ................... 477/174
6,203,468 B1 * 3/2001 Nitta et al. ........................ 477/5
(Continued)

FOREIGN PATENT DOCUMENTS

JP 2007-191049 A 8/2007
JP 2007-269256 A 10/2007
(Continued)

*Primary Examiner* — Mary Cheung
*Assistant Examiner* — Michael Berns
(74) *Attorney, Agent, or Firm* — Kenyon & Kenyon LLP

(57) ABSTRACT

A control device of a vehicle drive device includes a hydraulic power transmission device having an input-side rotating element to which power from an engine is input and an output-side rotating element outputting power to drive wheels, a first electric motor coupled to the input-side rotating element, and a second electric motor coupled to the drive wheels, the vehicle drive device having an electric path through which power is electrically transmitted between the first electric motor and the second electric motor and a mechanical path through which power is mechanically transmitted via the hydraulic power transmission device, the control device controlling an operating point of the engine by adjusting a torque of the first electric motor, the control device changing a proportion of power transmitted through the electric path and power transmission through the mechanical path based on a request amount when the operating point of the engine is controlled.

5 Claims, 11 Drawing Sheets

(51) Int. Cl.
  *B60W 10/08* (2006.01)
  *B60W 10/115* (2012.01)
  *B60W 30/188* (2012.01)
  *B60W 10/02* (2006.01)

(52) U.S. Cl.
  CPC ............. *B60W 2710/0644* (2013.01); *B60W 2710/0666* (2013.01); *B60W 2710/083* (2013.01); *Y02T 10/6221* (2013.01); *Y02T 10/6286* (2013.01); *Y10S 903/93* (2013.01)

(56) References Cited

U.S. PATENT DOCUMENTS

| | | | |
|---|---|---|---|
| 6,600,980 B1* | 7/2003 | Kraska et al. | 701/22 |
| 8,534,399 B2* | 9/2013 | Soliman et al. | 180/65.21 |
| 8,795,132 B2* | 8/2014 | Tabata et al. | 477/5 |
| 2008/0004156 A1* | 1/2008 | Tabata et al. | 477/3 |
| 2008/0196952 A1* | 8/2008 | Soliman et al. | 180/65.2 |
| 2008/0254940 A1* | 10/2008 | Stoffels et al. | 477/107 |
| 2010/0212981 A1* | 8/2010 | Roos et al. | 180/65.275 |
| 2011/0005215 A1 | 1/2011 | Ota et al. | |
| 2013/0245875 A1 | 9/2013 | Imamura et al. | |

FOREIGN PATENT DOCUMENTS

| | | |
|---|---|---|
| JP | 4277856 B2 | 6/2009 |
| JP | 2009-220618 A | 10/2009 |
| JP | 2010-031966 A | 2/2010 |
| JP | 2010-111317 A | 5/2010 |
| JP | 2010-215190 A | 9/2010 |
| WO | 2012/070156 A1 | 5/2012 |

* cited by examiner

|     | C1 | C2 | C3 | C4 | B1 | B2 |
|-----|----|----|----|----|----|----|
| 1st | O  |    |    |    |    | O  |
| 2nd | O  |    |    |    | O  |    |
| 3rd | O  |    | O  |    |    |    |
| 4th | O  |    |    | O  |    |    |
| 5th | O  | O  |    |    |    |    |
| 6th |    | O  |    | O  |    |    |
| 7th |    | O  | O  |    |    |    |
| 8th |    | O  |    |    | O  |    |
| Rev1 |   |    | O  |    |    | O  |
| Rev2 |   |    |    | O  |    | O  |

CONTROL DEVICE FOR VEHICLE DRIVE DEVICE

CROSS-REFERENCE TO RELATED APPLICATIONS

This is a national phase application based on the PCT International Patent Application No. PCT/JP2011/064986 filed on Jun. 29, 2011, the entire contents of which are incorporated herein by reference.

TECHNICAL FIELD

The present invention relates to a control device of a vehicle drive device including an engine, an electric motor, and a hydraulic power transmission device such that power of the engine can be transmitted through a plurality of transmission paths.

BACKGROUND ART

A vehicle drive device is well known that includes a hydraulic power transmission device having an input-side rotating element to which power from an engine is input and an output-side rotating element outputting power to drive wheels. For example, this corresponds to a vehicle drive device described in Patent Document 1. Such a vehicle drive device has an engine rotation speed (corresponding to a rotation speed of the input-side rotating element of the hydraulic power transmission device) passively determined depending on a vehicle speed (corresponding to a rotation speed of the output-side rotating element of the hydraulic power transmission device), a hydraulic characteristic of the hydraulic power transmission device, and engine output. Power transmission efficiency is also passively determined in a mechanical path hydraulically transmitting the engine output through the hydraulic power transmission device.

PRIOR ART DOCUMENT

Patent Document

Patent Document 1: Japanese Laid-Open Patent Publication No. 2009-220618

SUMMARY OF THE INVENTION

Problem to be Solved by the Invention

Considering improvement in fuel efficiency of a vehicle, for example, it is desirable to drive an engine at an operating point of the engine (referred to as an engine operating point) reducing a fuel consumption rate as low as possible. It is also desirable to improve power transmission efficiency when power is transmitted from the engine. In this regard, in a vehicle drive device having a first electric motor disposed such that power can be transmitted to an input side of a hydraulic power transmission device and a second electric motor disposed such that power can be transmitted to drive wheels, it is conceivable that the first electric motor arbitrarily controls the engine operating point. In such a case, a transmission path transmitting the engine output to the drive wheel side is implemented by using both a mechanical path via the hydraulic power transmission device and an electric path through electric power transmission between the first electric motor and the second electric motor. However, even when the engine operating point can arbitrarily be controlled by using the electric path in addition to the mechanical path, if the control is provided mainly for the purpose of fuel efficiency improvement, the characteristics of the respective transmission paths cannot be utilized, and various requests such as an acceleration request and a warm-up request may not properly be satisfied. In other words, the control implemented with priority given only to the fuel efficiency improvement may deteriorate drivability or delay warm-up. The problem as described above is not known and no proposal has been made for using both the mechanical path and the electric path with consideration given to various requests other than fuel efficiency in a vehicle drive device capable of controlling the engine operating point with the first electric motor.

The present invention was conceived in view of the situations and it is therefore an object of the present invention to provide a control device of a vehicle drive device capable of realizing various requests other than fuel efficiency when an engine operating point is controlled by adjusting torque of an electric motor.

Means for Solving the Problem

To achieve the object, the first aspect of the invention provides (a) a control device of a vehicle drive device including a hydraulic power transmission device having an input-side rotating element to which power from an engine is input and an output-side rotating element outputting power to drive wheels, a first electric motor directly or indirectly coupled to the input-side rotating element, and a second electric motor directly or indirectly coupled to the drive wheels, (b) the vehicle drive device having an electric path through which power is electrically transmitted by giving/receiving electric power between the first electric motor and the second electric motor and a mechanical path through which power is mechanically transmitted via the hydraulic power transmission device, the control device of the vehicle drive device being configured to control an operating point of the engine by adjusting a torque of the first electric motor, (c) the control device of the vehicle drive device changing a proportion of power transmitted by power transmission through the electric path and power transmission through the mechanical path based on a request amount when the operating point of the engine is controlled.

Effects of the Invention

Consequently, since the vehicle drive device has an electric path through which power is electrically transmitted by giving/receiving electric power between the first electric motor and the second electric motor and a mechanical path through which power is mechanically transmitted via the hydraulic power transmission device, and the control device of the vehicle drive device can control an operating point of the engine without being constrained by a rotation speed of the output-side rotating element by adjusting a torque of the first electric motor, for example, the engine can be driven at the optimal operating point for the fuel efficiency improvement and the fuel efficiency improvement of the vehicle can be achieved. Additionally, when the operating point of the engine is controlled, a proportion of the power transmitted by the power transmission through the electric path and the power transmission through the mechanical path is changed based on request amounts and, therefore, the respective characteristics of the mechanical path and the electric path are effectively brought out to satisfy the various requests. Therefore, when the engine operating point control is provided by adjusting the torque of the electric motor, various requests other than the fuel efficiency can be realized.

The second aspect of the invention provides the control device of the vehicle drive device recited in the first aspect of the invention, wherein the hydraulic power transmission device is a torque converter having a pump impeller that is the input-side rotating element and a turbine impeller that is the output-side rotating element, wherein the request amount is an acceleration request amount, and wherein if the acceleration request amount is larger, the proportion of the power transmitted through the mechanical path is increased as compared to when the acceleration request amount is smaller. Consequently, if the acceleration request amount is relatively larger, the torque amplification effect of the torque converter can more effectively be utilized to facilitate the acquisition of an acceleration feeling and improve the acceleration performance. From another viewpoint, when the acceleration request amount is relatively larger, if the operating point of the engine is moved for achieving an improvement in fuel efficiency of a vehicle, a problem may occur that the electric power given/received between the first electric motor and the second electric motor tends to increase; however, by reducing the proportion of the power transmission through the electric path and increasing the proportion of the power transmission through the mechanical path where the torque amplification effect of the torque converter is acquired, the acceleration performance can be improved. On the other hand, if the acceleration request amount is relatively smaller, the power transmission through the electric path is more effectively utilized and, for example, the engine can be driven at the engine operating point suitable for the fuel efficiency improvement, thereby achieving the fuel efficiency improvement of the vehicle.

The third aspect of the invention provides the control device of the vehicle drive device recited in the first or second aspect of the invention, wherein the request amount is a presence of a warm-up request to the vehicle drive device, and wherein if the warm-up request is present, the proportion of the power transmitted through the mechanical path is increased as compared to when the warm-up request is absent. Consequently, if the warm-up request is present, the loss due to the mechanical path can be increased to facilitate a rise in the operating oil temperature of the vehicle drive device, thereby improving the warm-up performance. In particular, if the warm-up request is present, the power transmitted through the mechanical path can be increased to make the loss greater, thereby promoting the warm-up. On the other hand, if the warm-up request is absent, the power transmission through the electric path is more effectively utilized and, for example, the engine can be driven at the engine operating point more suitable for the fuel efficiency improvement, thereby achieving the fuel efficiency improvement of the vehicle.

The fourth aspect of the invention provides the control device of the vehicle drive device recited in any one of the first to third aspects of the invention, wherein the torque of the first electric motor is adjusted such that a sum of an engine torque and the torque of the first electric motor is balanced with an input-side load torque generated in the input-side rotating element depending on a speed ratio of the hydraulic power transmission device. Consequently, the first electric motor torque can easily be adjusted based on the characteristics of the hydraulic power transmission device.

The fifth aspect of the invention provides the control device of the vehicle drive device recited in any one of the first to fourth aspects of the invention, wherein the operating point of the engine is controlled by adjusting the torque of the first electric motor such that the operating point of the engine is located along a predetermined operation curve of the engine and that a target value of engine output is achieved. Consequently, the engine is operated at an engine operating point increasing an engine efficiency as high as possible, i.e., an engine operating point reducing a fuel consumption rate as low as possible.

The sixth aspect of the invention provides the control device of the vehicle drive device recited in any one of the first to fifth aspects of the invention, wherein the operating point of the engine is shifted to the side of greater total efficiency represented by a product of a power transmission efficiency when power from the engine is transmitted through the electric path and the mechanical path and an engine efficiency at the operating point of the engine. Consequently, as compared to the case that the operating point of the engine is not changed depending on the total efficiency, the efficiency of the vehicle drive device is increased as a whole and the vehicle fuel efficiency can be improved.

MODE FOR CARRYING OUT THE INVENTION

In the present invention, preferably, fuel efficiency refers to a running distance per unit fuel consumption etc., and improvement in the fuel efficiency refers to extension of the running distance per unit fuel consumption, or reduction in fuel consumption rate (=fuel consumption/drive wheel output) of the vehicle as a whole.

Preferably, the operating point of the engine is an operating point indicative of an operating state of the engine represented by rotation speed and output torque of the engine etc. In other words, the operating point of the engine refers to an operating state of the engine indicated by one point in two-dimensional coordinates of an axis indicative of the rotation speed of the engine and an axis indicative of the output torque of the engine.

Preferably, the vehicle drive device includes an electric storage device connected to each of the first electric motor and the second electric motor such that electric power can be given/received and the second electric motor is supplied with a remaining portion of the electric power generated by the first electric motor after subtracting the electric power to be stored into the electric storage device, so as to drive the second electric motor.

Preferably, adjusting torque of the first electric motor means adjusting power (electric power) transmitted through the electric path, or in other words, adjusting a power transmission rate of the electric path or the mechanical path. Therefore, the operating point of the engine is controlled by adjusting the power transmitted through the electric path.

Preferably, the electric path is a power transmission path through which power is electrically transmitted by supplying all or a portion of the electric power generated by the first electric motor to the second electric motor.

An example of the present invention will now be described in detail with reference to the drawings.

Example

Figures 1, 2:
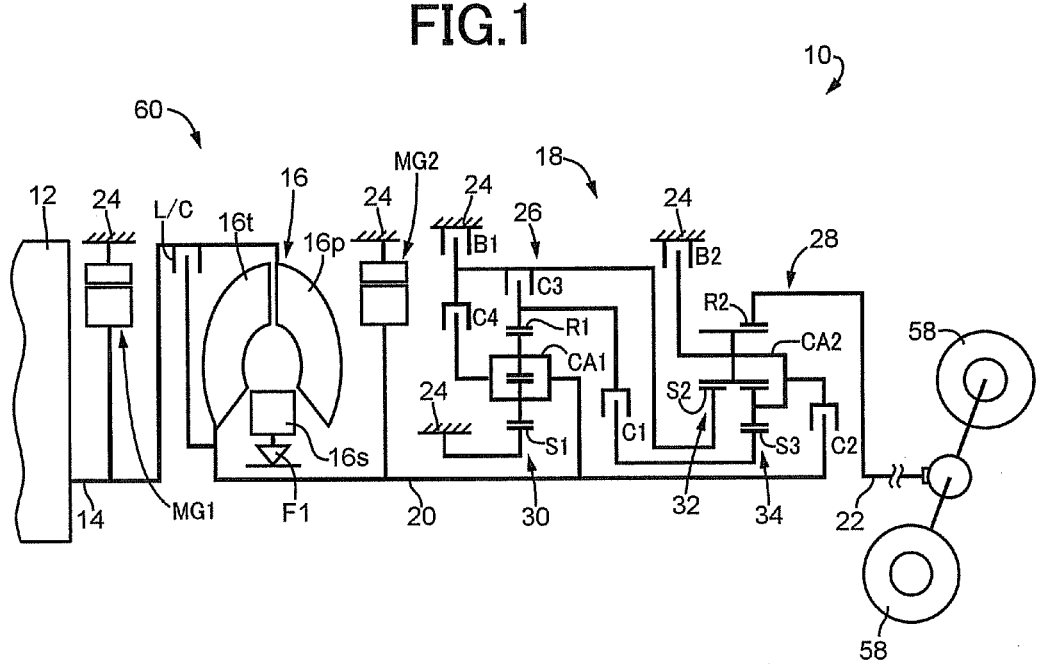
FIG. 1 is a schematic for explaining a configuration of a vehicle drive device of an example of the present invention.
FIG. 2 is an operation table of hydraulic friction engagement devices for establishing shift stages in the automatic transmission depicted in FIG. 1.

FIG. 1 is a schematic for explaining a configuration of a vehicle drive device 10 of an example of the present invention. In FIG. 1, the vehicle drive device 10 is preferably employed in FR (front-engine rear-drive) type vehicles and includes an engine 12 made up of an internal-combustion engine, a torque converter (hydraulic power transmission device) 16 coupled to a crankshaft 14 of the engine 12, an automatic transmission 18 disposed between the torque converter 16 and drive wheels 58 and coupled to an output side of the torque converter 16, a first electric motor MG1 disposed between the engine 12 and the torque converter 16 and coupled to the crankshaft 14, and a second electric motor MG2 disposed between the torque converter 16 and the automatic transmission 18 and coupled to an input shaft 20 of the automatic transmission 18. The torque converter 16, the automatic transmission 18, the first electric motor MG1, the second electric motor MG2, etc., are configured symmetrically relative to the common axial center thereof and the lower halves thereof from the axial center are not depicted in FIG. 1.

The torque converter 16 is a hydraulic power transmission device including a pump impeller 16p acting as an input-side rotating element to which power from the engine 12 is input, a turbine impeller 16t acting as an output-side rotating element outputting power to the drive wheels 58, a stator impeller 16s, and a unidirectional clutch F1. The pump impeller 16p, i.e., a pump impeller, is coupled to the crankshaft 14 of the engine 12 and the first electric motor MG1 and is rotationally driven by the engine 12 to generate a fluid flow due to a flow of operating oil in the torque converter 16. The turbine impeller 16t, i.e., a turbine runner, is coupled to the input shaft 20 of the automatic transmission 18 and rotated in response to the fluid flow from the pump impeller 16p. The stator impeller 16s is disposed in the fluid flow from the pump impeller 16p to the turbine impeller 16t and supported by the unidirectional clutch F1 rotatably in the positive rotation direction of the crankshaft 14 (the rotation direction of the crankshaft 14 during an operation of the engine 12) and non-rotatably in the negative rotation direction. The input shaft 20 of the automatic transmission 18 also acts as an output shaft, i.e., a turbine shaft, of the torque converter 16. As can be seen from FIG. 1, since the engine 12, the first electric motor MG1, and the pump impeller 16p are coupled in series in this example, a rotation speed Np of the pump impeller 16p (hereinafter referred to as a pump rotation speed Np) is the same as a rotation speed $N_{MG1}$ of the first electric motor MG1 (hereinafter referred to as a first electric motor rotation speed $N_{MG1}$) and an engine rotation speed Ne. Since the turbine impeller 16t, the second electric motor MG2, and the input shaft 20 of the automatic transmission 18 are coupled in series, a rotation speed Nt of the turbine impeller 16t (hereinafter referred to as a turbine rotation speed Nt) is the same as a rotation speed $N_{MG2}$ of the second electric motor MG2 (hereinafter referred to as a second electric motor rotation speed $N_{MG2}$) and a rotation speed $N_M$ of the input shaft 20.

The torque converter 16 includes a lockup clutch L/C capable of direct coupling between the pump impeller 16p and the turbine impeller 16t. The lockup clutch L/C is controlled to be in one of a completely engaged state, a slipping state, and a released state. When the lockup clutch L/C is in the released state, the torque is transmitted between the crankshaft 14 and the input shaft 20 via the operating oil in the torque converter 16 as described above. When the lockup clutch L/C is in the completely engaged state, the crankshaft 14 of the engine 12 and the input shaft 20 of the automatic transmission 18 are integrally coupled to each other and the torque is directly transmitted between the crankshaft 14 and the input shaft 20 without the intervention of the operating oil in the torque converter 16.

The first electric motor MG1 is coupled to the crankshaft 14 of the engine 12 in series via a damper etc., absorbing pulsation, for example, and is directly coupled to the pump impeller 16p of the torque converter 16. The second electric motor MG2 is coupled to the drive wheels 58 indirectly via the automatic transmission 18 etc. The first electric motor MG1 and the second electric motor MG2 are rotators configured to selectively acquire a function as an electric motor generating drive torque and a function as an electric generator generating regenerative torque and are made up of AC synchronous motor generators, for example. An electric storage device 36 acting as a battery and an inverter 38 for controlling the electric motors MG1 and MG2 are disposed in the vehicle drive device 10 (see FIG. 3), and the electric storage device 36, the first electric motor MG1, and the second electric motor MG2 are connected such that electric power can mutually be given/received. The first electric motor MG1 and the second electric motor MG2 can apply drive torque in the positive rotation direction to the crankshaft 14 and the input shaft 20 through the drive thereof and can apply load torque, i.e., braking torque, in the negative rotation direction to the crankshaft 14 and the input shaft 20 through the electric generation (regeneration) thereof while charging the electric storage device 36 disposed in a vehicle via the inverter 38. The positive rotation direction of the crankshaft 14 and the input shaft 20 is the rotation direction of the crankshaft 14 while the engine 12 is driven and the negative rotation direction is the rotation direction opposite to the positive rotation direction.

The automatic transmission 18 is interposed between the torque converter 16 and the drive wheels 58 and is a known planetary-gear type multistage transmission including a first transmission portion 26 mainly made up of a first planetary gear device 30 and a second transmission portion 28 mainly made up of a second planetary gear device 32 and a third planetary gear device 34 in a transmission case 24 acting as a non-rotating member. In the automatic transmission 18, known hydraulic friction engagement devices (clutches C1 to C4, brakes B1 and B2) are respectively engaged or released in accordance with a predefined operation table depicted in FIG. 2 to establish a plurality of shift stages having respective different gear ratios $\gamma_{AT}$ (=rotation speed $N_{ATIN}$ of the input shaft 20/rotation speed $N_{OUT}$ of an output shaft 22) of the automatic transmission 18. In FIG. 2, "○" indicates an engaged state and a blank indicates a released state. The automatic shift control of the automatic transmission 18 is provided in accordance with a known relationship (shift diagram, shift map) having preliminarily stored upshift and downshift lines.

The vehicle drive device 10 configured as described above switches and actuates engine running causing the vehicle to run with the power of the engine 12 and motor running causing the vehicle to run with the power of the second electric motor MG2, depending on a running state of the vehicle. The switching between the engine running and the motor running is performed based on which of an engine running range and a motor running range set in the same two-dimensional coordinates as the shift diagram a running state of the vehicle belongs to.

In the vehicle drive device 10, for example, even when the vehicle running state belongs to the motor running range, if a charge remaining amount SOC (state of charge) of the electric storage device 36 is equal to or less than a predetermined value, the engine running is performed. When the vehicle is suddenly started or rapidly accelerated, the control is provided as needed such as using output of both the engine 12 and the second electric motor MG2 for running the vehicle.

Figure 3:
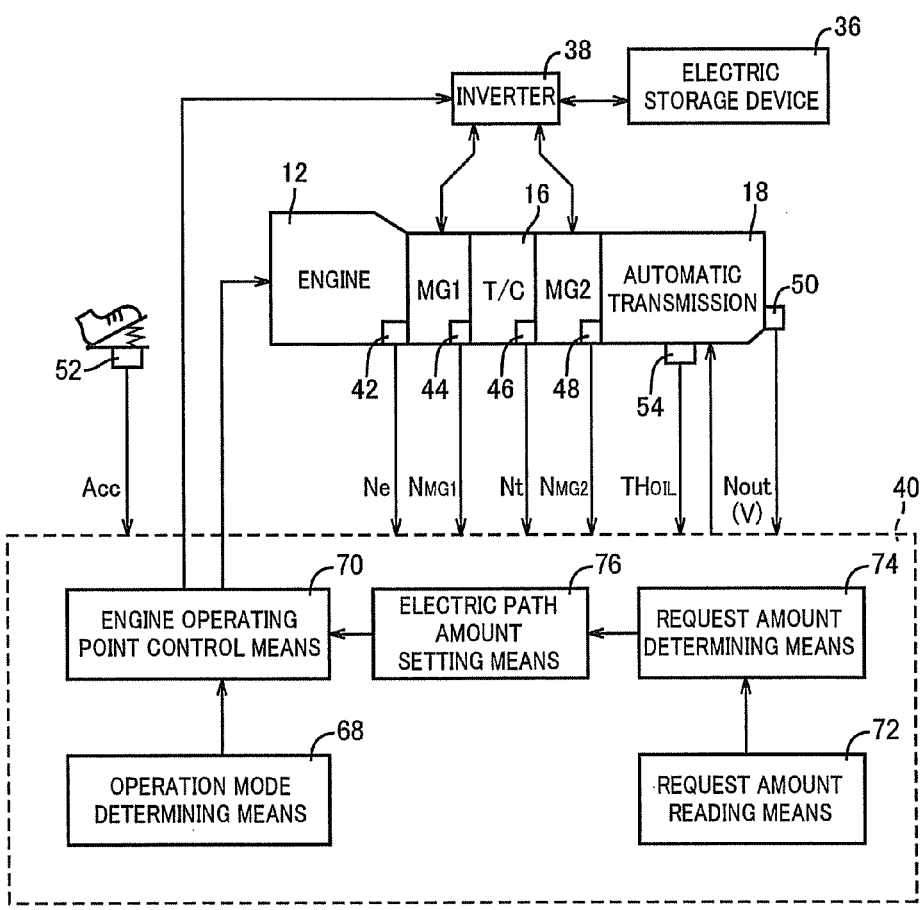
FIG. 3 is a diagram for explaining input signals input from sensors to an electronic control device for controlling the vehicle drive device of FIG. 1 and is a functional block diagram for explaining a main portion of the control function included in the electronic control device.

FIG. 3 is a diagram for explaining input signals input from sensors to an electronic control device 40 for controlling the vehicle drive device 10 and is a functional block diagram for explaining a main portion of the control function included in the electronic control device 40. In FIG. 3, the electronic control device 40 has a function as a control device of the vehicle drive device 10 and includes a so-called microcomputer equipped with a CPU, a RAM, a ROM, and an input/output interface, and the CPU executes signal processes in accordance with programs stored in advance in the ROM, while utilizing a temporary storage function of the RAM, to provide output control of the engine 12, shift control of the automatic transmission 18, and output control of the electric motors MG1 and MG2. The electronic control device 40 is supplied with various input signals (e.g., rotation speeds Ne, $N_{MG1}$, Nt, $N_{MG2}$, $N_{out}$ (vehicle speed V), an acceleration opening degree Acc, and an operating oil temperature $TH_{OIL}$) detected by respective sensors (e.g., rotation speed sensors 42, 44, 46, 48, 50, an accelerator opening degree sensor 52, and an oil temperature sensor 54) depicted in FIG. 3 disposed on the vehicle. The electronic control device 40 supplies various output signals (e.g., an engine output control signal, an electric motor output control signal, and an oil pressure control signal) to devices disposed on the vehicle.

Figure 4:
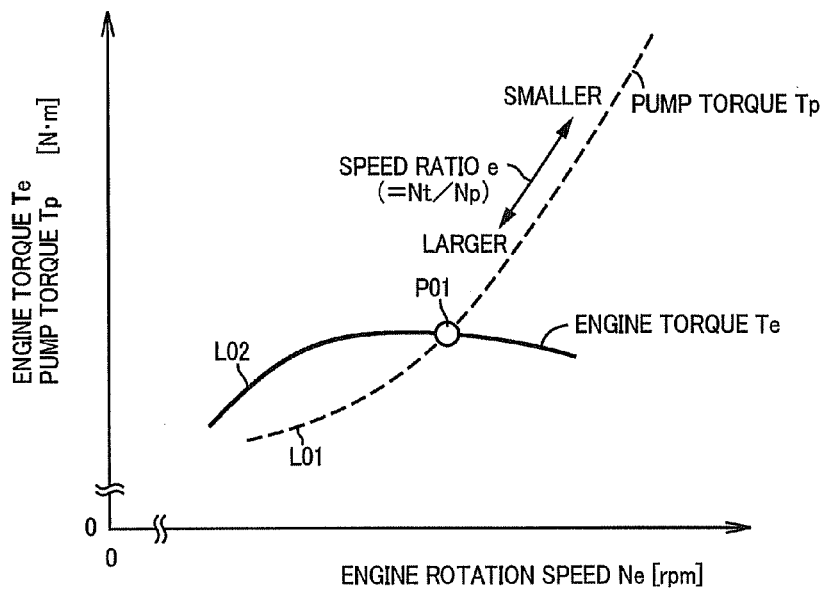
FIG. 4 is a diagram for explaining how the engine operating point is determined while the first electric motor and the second electric motor are not actuated in the vehicle drive device of FIG. 1.

FIG. 4 is a diagram for explaining how the operating point of the engine 12 is determined while the first electric motor MG1 and the second electric motor MG2 are not actuated. As depicted in FIG. 4, pump torque Tp is input-side load torque Tp generated in the pump impeller (input-side rotating element) 16p depending on a speed ratio e (=Nt/Np) of the torque converter 16 and has relationship with the engine rotation speed Ne as indicated by, for example, a broken line L01, under a certain turbine rotation speed Nt. The relationship between the pump torque Tp and the engine rotation speed Ne (=Np) indicated by the broken line L01 is relationship satisfying an equation "Tp=τ×Ne$^2$" when expressed by using a capacity coefficient τ of the torque converter 16, which is a function of the speed ratio e. Therefore, as depicted in FIG. 4, when the engine rotation speed Ne is higher, the speed ratio e of the torque converter 16 is smaller, and when the engine rotation speed Ne is higher, the pump torque Tp is larger. On the other hand, output torque Te of the engine 12 (hereinafter referred to as engine torque Te) has relationship with the engine rotation speed Ne as indicated by, for example, a solid line L02, under a certain throttle valve opening degree $\theta_{TH}$ of an electronic throttle valve of the engine 12, and the solid line L02 intersects with the broken line L01. An intersection point P01 between the broken line L01 and the solid line L02 indicates a point of balance between the engine torque Te and the pump torque Tp and the intersection point P01 is defined as the operating point of the engine 12. Therefore, the operating point of the engine 12 is passively determined based on the turbine rotation speed Nt and the throttle valve opening degree $\theta_{TH}$. In contrast, in this example, the operating point of the engine 12 can arbitrarily be changed by providing the output control of the first electric motor MG1 without being constrained by the turbine rotation speed Nt. This can be described with reference to FIG. 5.

Figure 5:
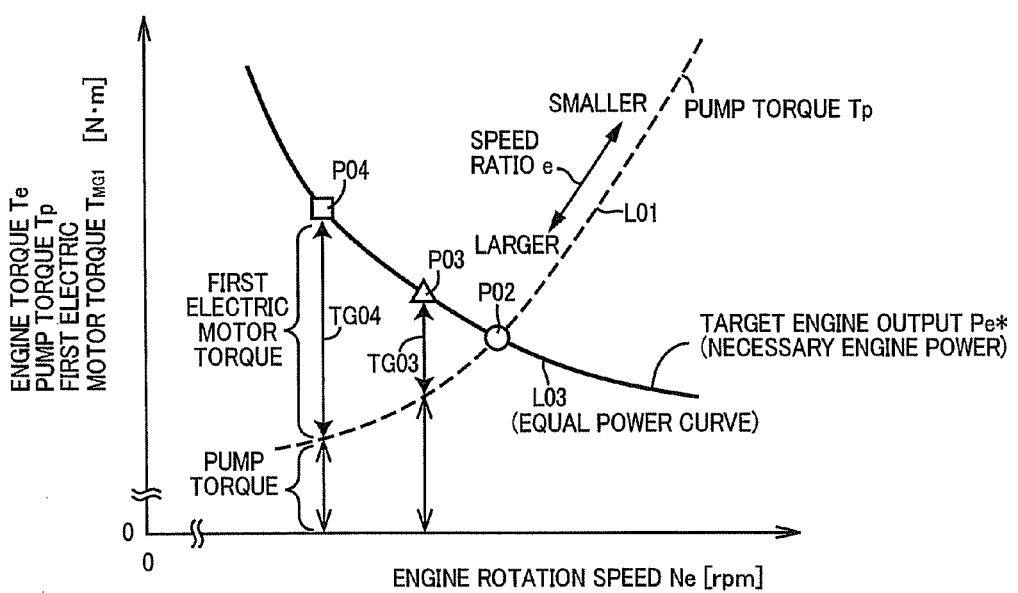
FIG. 5 is a diagram for explaining that the engine operating point can arbitrarily be changed by controlling the first electric motor in the vehicle drive device of FIG. 1.

FIG. 5 is a diagram for explaining that the operating point of the engine 12 can arbitrarily be changed by controlling the first electric motor MG1. In FIG. 5, the same reference numerals as FIG. 4 mutually denote the same elements and the turbine rotation speed Nt is assumed to be the same as FIG. 4. A solid line L03 of FIG. 5 is an equal power curve indicative of relationship between the engine rotation speed Ne and the engine torque Te when a necessary engine power Pe*, i.e., a target engine output Pe* serving as a target value of an engine output Pe (e.g., in kW) is set to a constant value and control is provided such that the engine output Pe converges to the target engine output Pe*. FIG. 5 depicts an example when the operating point of the engine 12 is arbitrarily set on the equal power curve (solid line L03). In FIG. 5, when the relationship between the pump torque Tp and the engine rotation speed Ne is indicated by the broken line L01 and the engine output Pe is set to the target engine output Pe* indicated by the solid line L03, if output torque $T_{MG1}$ of the first electric motor MG1 (hereinafter referred to as first electric motor torque $T_{MG1}$) is not generated, the operating point of the engine 12 is a point P02; if the first electric motor MG1 is driven to perform electric generation operation and the first electric motor torque $T_{MG1}$ of TG03 is generated in the negative rotation direction, the operating point of the engine 12 is a point P03; and if the absolute value of the first electric motor torque $T_{MG1}$ is raised and the first electric motor torque $T_{MG1}$ of TG04 is generated in the negative rotation direction, the operating point of the engine 12 is a point P04. In short, in the vehicle drive device 10 of this example, the first electric motor torque $T_{MG1}$ can be adjusted such that the sum of the engine torque Te and the first electric motor torque $T_{MG1}$ is balanced with the pump torque Tp, i.e., such that the relationship of "Tp=Te+$T_{MG1}$ ($T_{MG1}$ of FIG. 5 is a negative value)" is satisfied, so as to arbitrarily change the operating point of the engine 12 without being constrained by the turbine rotation speed Nt. If the first electric motor MG1 is driven to perform electric generation operation, electric power generated by the first electric motor MG1 may be stored in the electric storage device 36; however, the electric power is basically supplied to the second electric motor MG2 and the second electric motor MG2 is driven. Therefore, the vehicle drive device 10 includes two power transmission paths, i.e., an electric path through which power (e.g., in kW) is electrically transmitted by giving/receiving electric power between the first electric motor MG1 and the second electric motor MG2 and a mechanical path through which power is mechanically transmitted via the torque converter 16, in parallel with each other between the engine 12 and the drive wheels 58. Since the operating point of the engine 12 can continuously be changed by adjusting the first electric motor torque $T_{MG1}$ without being constrained by the turbine rotation speed Nt as described above, the first electric motor MG1, the second electric motor MG2, and the torque converter 16 can perform continuously variable transmission operation in which a gear ratio (=Ne/Nt) is changed in a substantially stepless manner as a whole and it can be said that a continuously variable transmission 60 is formed.

Figure 6:
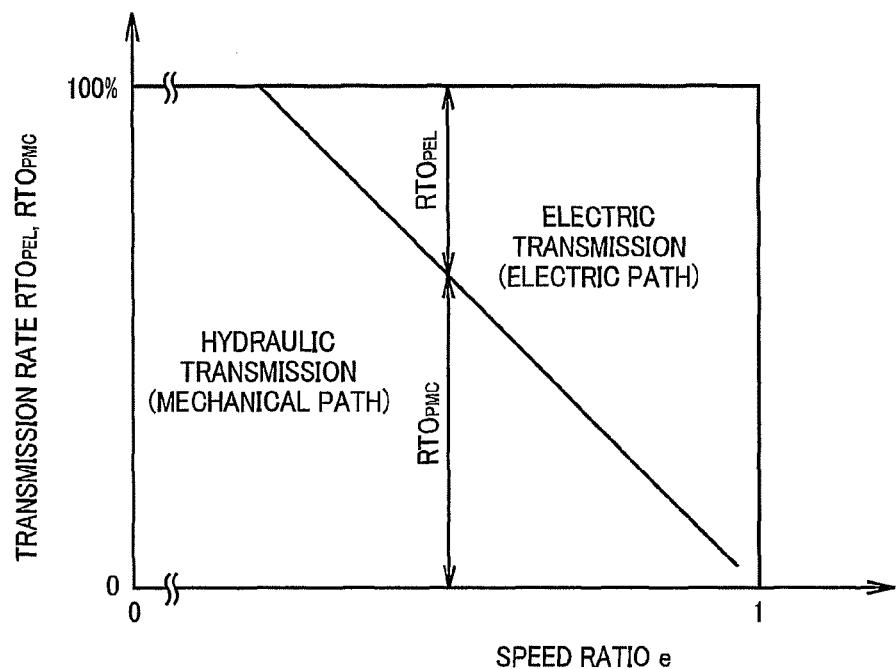
FIG. 6 is a conceptual diagram for explaining a proportion (transmission rate) of power transmitted through each of the electric path and the mechanical path when the engine operating point is changed under a certain target engine output in the vehicle drive device of FIG. 1.

FIG. 6 is a conceptual diagram for explaining a proportion (transmission rate) of power transmitted through each of the electric path and the mechanical path when the operating point of the engine 12 is changed under a certain target engine output Pe*. In FIG. 6, electric transmission represents that the power from the engine 12 is electrically transmitted, and therefore means the power transmission through the electric path, and hydraulic transmission represents that the power from the engine 12 is transmitted through fluid (the operating oil) in the torque converter 16, and therefore means the power transmission through the mechanical path. In FIG. 5, the output control of the first electric motor MG1 is provided such that the first electric motor torque $T_{MG1}$ increases in absolute value in the negative rotation direction as the engine rotation speed Ne becomes lower, i.e., the speed ratio e of the torque converter 16 becomes larger and, therefore, as depicted in FIG. 6, when the speed ratio e becomes larger toward one, a transmission rate $RTO_{PEL}$ of power through the electric transmission becomes larger while a transmission rate $RTO_{PMC}$ of power through the hydraulic transmission becomes smaller and, specifically, when the speed ratio e is closer to one, the transmission rate $RTO_{PEL}$ of power through the electric transmission becomes closer to 100%. This tendency of change in the transmission rates $RTO_{PEL}$ and $RTO_{PMC}$ relative to the speed ratio e is the same regardless of the target engine output Pe* or the turbine rotation speed Nt.

Figure 7:
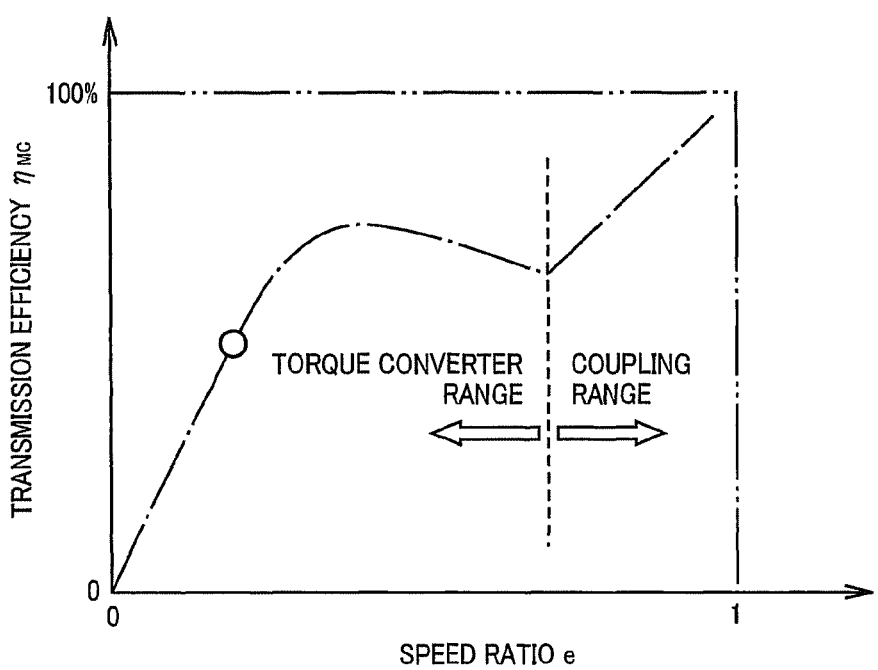
FIG. 7 is a diagram of relationship between transmission efficiency of the torque converter only, i.e., transmission efficiency of the mechanical path and a speed ratio of the torque converter in the vehicle drive device of FIG. 1.

Power transmission efficiency (=output power/input power; also simply referred to as transmission efficiency throughout the description) in the continuously variable transmission 60 made up of the first electric motor MG1, the second electric motor MG2, and the torque converter 16 will be described. First, transmission efficiency $\eta_{MC}$ of the torque converter 16 only, i.e., transmission efficiency $\eta_{MC}$ of the mechanical path, will be described with reference to FIG. 7. As depicted in FIG. 7, in a torque converter range on the side of a smaller speed ratio e, the transmission efficiency $\eta_{MC}$ of the torque converter 16 has a local maximum value at a predetermined speed ratio e and the transmission efficiency $\eta_{MC}$ becomes zero when the speed ratio e is zero. In a coupling range on the side of a larger speed ratio e, the transmission efficiency $\eta_{MC}$ becomes higher when the speed ratio e is larger, and the transmission efficiency $\eta_{MC}$ becomes highest when the speed ratio e is close to one in the torque converter range and the coupling range as a whole. Considering transmission efficiency $\eta_{EL}$ of the electric path and the transmission rates $RTO_{PEL}$ and $RTO_{PMC}$ depicted in FIG. 6 along with the transmission efficiency $T_{MC}$ of the torque converter 16, combined transmission efficiency $T_{CVT}$ can be obtained that is transmission efficiency in the case of transmitting the power from the engine 12 through the electric path and the mechanical path, i.e., the transmission efficiency $\eta_{CVT}$ of the entire continuously variable transmission 60.

Figure 8:
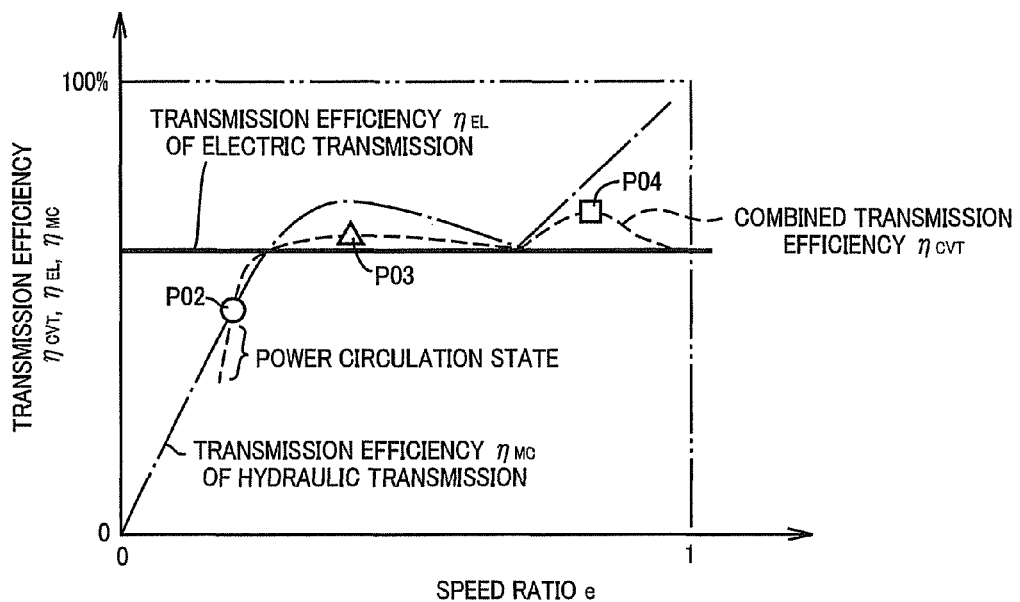
FIG. 8 is a diagram of relationship between the combined transmission efficiency $\eta_{CVT}$ and the speed ratio of the torque converter in the vehicle drive device of FIG. 1.

FIG. 8 is a diagram of relationship between the combined transmission efficiency $\eta_{CVT}$ and the speed ratio e of the torque converter 16 when it is assumed that the transmission efficiency $\eta_{EL}$ of the electric path is constant. In FIG. 8, a dashed-dotted line indicative of the transmission efficiency $\eta_{MC}$ of the mechanical path (hydraulic transmission) is the same as that of FIG. 7. As indicated by a solid line of FIG. 8, the transmission efficiency $\eta_{EL}$ of the electric path (electric transmission) is almost unchanged even when the speed ratio e of the torque converter 16 is changed, as compared to the transmission efficiency $\eta_{MC}$ of the mechanical path (hydraulic transmission). If the power from the engine 12 is transmitted through both the mechanical path and the electric path at the transmission rates $RTO_{PEL}$ and $RTO_{PMC}$ as depicted in FIG. 6 depending on the speed ratio e, the combined transmission efficiency $\eta_{CVT}$ is changed as indicated by a broken line in accordance with the speed ratio e. The points P02, P03, and P04 of FIG. 8 are the points P02, P03, and P04, respectively, of FIG. 5 expressed on the coordinate system of FIG. 8 and, in the case of FIG. 8, the combined transmission efficiency $\eta_{CVT}$ becomes highest at the speed ratio e indicated by the point P04 among the three points P02, P03, and P04. In FIG. 8, in a range of the speed ratio e lower than the speed ratio e indicated by the point P02, the combined transmission efficiency $\eta_{CVT}$ indicated by a broken line is significantly reduced lower than the transmission efficiency $\eta_{MC}$ of the mechanical path, and this is because the electric power transmission state between the first electric motor MG1 and the second electric motor MG2 turns to a power circulation state in which the first electric motor MG1 consumes electric power while the second electric motor MG2 generates electricity, or in other words, a power circulation state in which power is electrically transmitted from the second electric motor MG2 to the first electric motor MG1.

Since the vehicle drive device 10 can continuously change the operating point of the engine 12 by adjusting the first electric motor torque $T_{MG1}$ without being constrained by the turbine rotation speed Nt as described above, this example utilizes this function, i.e., the continuously variable transmission function of the continuously variable transmission 60 to provide control for efficiently activating the engine 12 and, moreover, for allowing the vehicle drive device 10 including the engine 12 to efficiently operate as a whole. A main portion of the control function will hereinafter be described.

Returning to FIG. 3, as depicted in FIG. 3, the electronic control device 40 includes an operation mode determining means 68 as an operation mode determining portion, and an engine operating, point control means 70 as an engine operating point control portion.

The operation mode determining means 68 determines whether a predetermined system optimum operation mode is selected. For example, if an operation mode switch is turned on that is a switch switched on when a driver selects the system optimum operation mode, the operation mode determining means 68 determines that the system optimum operation mode is selected. The system optimum operation mode is an operation mode for achieving efficiency improvement in the engine 12 and the continuously variable transmission 60 as a whole rather than efficiently activating only the engine 12, and is selected when it is desired to give very high priority to the fuel efficiency improvement. The system optimum operation mode may automatically be selected, for example, when the accelerator opening degree Acc is almost unchanged, instead of depending on switching of the operation mode switch.

Figure 9:
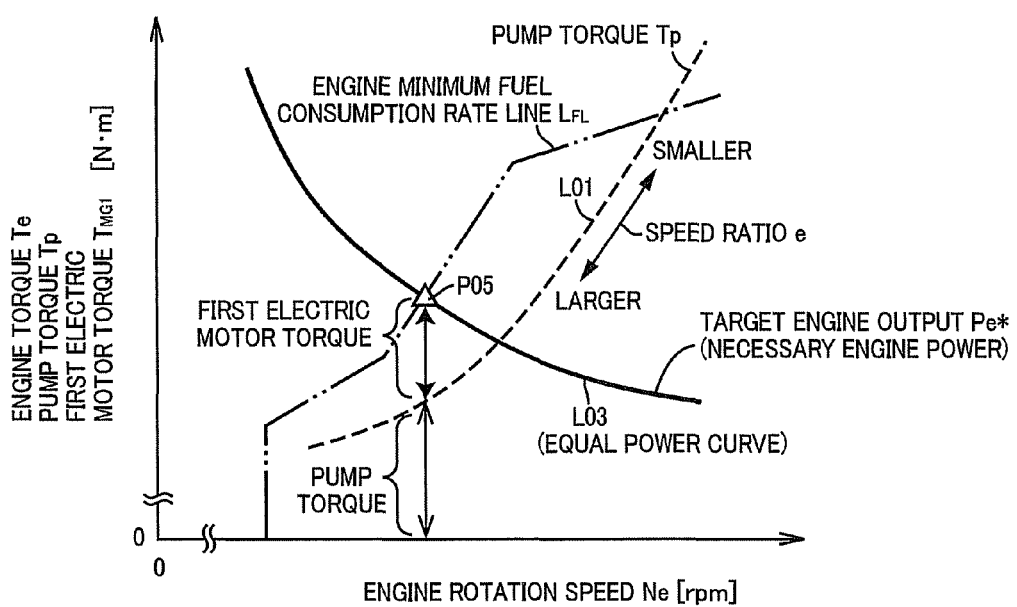
FIG. 9 is a diagram of the first electric motor torque and the pump torque when an operating point on the engine minimum fuel consumption rate line is defined as the target engine operating point in the coordinate system same as FIG. 5 under a certain turbine rotation speed.

The engine operating point control means 70 provides the engine operating point control in which the first electric motor torque $T_{MG1}$ is adjusted to control the operating point of the engine 12 during the engine running. When the first electric motor torque $T_{MG1}$ is adjusted, specifically, as depicted in FIG. 5, the first electric motor torque $T_{MG1}$ is adjusted such that the sum of the engine torque Te and the first electric motor torque $T_{MG1}$ is balanced with the pump torque Tp that is the input-side load torque of the torque converter 16. Since the engine operating point control means 70 basically causes the first electric motor MG1 to perform the electric generation operation in the engine operating point control, the first electric motor torque $T_{MG1}$ is a negative value except the power circulation state. Specifically describing the engine operating point control, first, the engine operating point control means 70 sequentially determines the target engine operating point as an operating point P05 of the engine 12 at which the target engine output Pe* is achieved on an engine minimum fuel consumption rate line $L_{FL}$ determined in advance as depicted in FIG. 9. FIG. 9 is a diagram of the first electric motor torque $T_{MG1}$ and the pump torque Tp when an operating point on the engine minimum fuel consumption rate line $L_{FL}$ is defined as the target engine operating point in the coordinate system same as FIG. 5 under a certain turbine rotation speed Nt, and the broken line L01 and the solid line L03 of FIG. 9 are the same as those of FIG. 5. The engine minimum fuel consumption rate line $L_{FL}$ is an operating curve of the engine 12 indicative of relationship between the engine rotation speed Ne and the engine torque Te empirically determined in advance such that the fuel consumption rate of the engine 12 is minimized, or in other words, is a series of fuel efficiency optimum points that are operating points optimal for the fuel efficiency improvement of the engine 12. The target engine output (necessary engine power) Pe* is an output requested by a driver to a vehicle and is sequentially determined by the engine operating point control means 70 based on the accelerator opening degree Acc and the vehicle speed V from relationship empirically determined in advance so as to accommodate the output request from the driver and, for example, the target engine output Pe* is determined to be larger when the accelerator opening degree Acc is larger. If the charge remaining amount SOC of the electric storage device 36 is reduced to a predetermined lower limit value or lower, a charge request is made to indicate that the electric storage device 36 should be charged and, preferably, for the target engine output Pe*, an electric power based on the charge request (requested charging power) is added to a calculation value based on the accelerator opening degree Acc and the vehicle speed V.

After determining the target engine operating point (point P05) on the engine minimum fuel consumption rate line $L_{FL}$ as described above, the engine operating point control means 70 calculates the pump torque Tp based on the engine rotation speed Ne indicated by the point P05 and calculates the first electric motor torque $T_{MG1}$ based on the pump torque Tp and the engine torque Te indicated by the point P05 as depicted in FIG. 9. The engine operating point control means 70 then calculates the speed ratio e of the torque converter 16 from the engine rotation speed Ne and the turbine rotation speed Nt indicated by the point P05.

After calculating the pump torque Tp and the first electric motor torque $T_{MG1}$ based on the target engine operating point (point P05) on the engine minimum fuel consumption rate line $L_{FL}$, since the transmission rate $RTO_{PMC}$ of the mechanical path and the transmission rate $RTO_{PEL}$ of the electric path are respectively obtained from the mechanical path output transmitted through the mechanical path and the electric path output transmitted through the electric path, the engine operating point control means 70 can calculate the combined transmission efficiency $\eta_{CVT}$ based on the speed rate e and the transmission rates $RTO_{PEL}$ and $RTO_{PMC}$ from the relationship between the speed ratio e and the transmission efficiency $\eta_{MC}$ of the mechanical path empirically obtained and set in advance and the relationship between the speed ratio e and the transmission efficiency $\eta_{EL}$ of the electric path empirically obtained and set in advance, as depicted in FIG. 8. Therefore, the engine operating point control means 70 sequentially calculates the combined transmission efficiency $\eta_{CVT}$.

Along with the calculation of the combined transmission efficiency $\eta_{CVT}$, the engine operating point control means 70 sequentially calculates engine efficiency $\eta_{ENG}$ based on the engine rotation speed Ne and the engine torque Te indicated by the target engine operating point (point P05) on the engine minimum fuel consumption rate line $L_{FL}$, from a relationship (engine efficiency map) empirically obtained and determined in advance between the operating point of the engine 12, which is indicated by the engine rotation speed Ne and the engine torque Te, and the engine efficiency $\eta_{ENG}$. The engine operating point control means 70 also sequentially calculates combined efficiency worm, i.e., total efficiency $\eta_{TOTAL}$, acquired as a product of the calculated combined transmission efficiency $\eta_{CVT}$ and the engine efficiency $\eta_{ENG}$. The engine efficiency $\eta_{ENG}$ is a proportion of heat quantity of a lower heating value converted into work when fuel supplied to the engine 12 is completely combusted.

The engine operating point control means 70 switches details of control in the engine operating point control depending on determination of the operation mode determining means 68. Specifically, if the operation mode determining means 68 determines that the system optimum operation mode is selected, the engine operating point control means 70 shifts the operating point of the engine 12 to the side of greater total efficiency $\eta_{TOTAL}$ that is the product of the combined transmission efficiency $\eta_{CVT}$ and the engine efficiency $T_{ENG}$.

For example, when shifting the target engine operating point to the side of greater total efficiency $\eta_{TOTAL}$ as described above, the engine operating point control means 70 gradually shifts the target engine operating point on the equal power curve (e.g., the solid line L03 of FIG. 9) indicative of the target engine output Pe* and sequentially calculates the first electric motor torque $T_{MG1}$ as well as the total efficiency $\eta_{TOTAL}$ based on the target engine operating point each time the target engine operating point is shifted. The target engine operating point at the local maximum (preferably the maximum) of the total efficiency $\eta_{TOTAL}$ is determined as the final target engine operating point.

On the other hand, if the operation mode determining means 68 determines that the system optimum operation mode is not selected, the engine operating point control means 70 does not shift the target engine operating point to the side of greater total efficiency $\eta_{TOTAL}$ from the engine minimum fuel consumption rate line $L_{FL}$ as described above and determines the target engine operating point on the engine minimum fuel consumption rate line $L_{FL}$ (point P05 of FIG. 9) as the final target engine operating point.

If the operation mode determining means 68 determines that the system optimum operation mode is selected or that the system optimum operation mode is not selected, when the final target engine operating point is determined, the engine operating point control means 70 sequentially sets the engine rotation speed Ne and the engine torque Te indicated by the final target engine operating point as target values, i.e., a target engine rotation speed Ne* and target engine torque Te*, respectively, and also sequentially sets the first electric motor torque $T_{MG1}$ and the first electric motor rotation speed $N_{MG1}$ (=engine rotation speed Ne) corresponding to the final target engine operating point as target values, i.e., target first electric motor torque $T_{MG1}$* and a target first electric motor rotation speed $N_{MG1}$*, respectively. The engine operating point control means 70 adjusts the throttle valve opening degree $\theta_{TH}$ to provide the output control of the engine 12 such that the actual engine torque Te matches, for example, follows, the target engine torque Te* and also controls the first electric motor MG1 such that the actual first electric motor torque $T_{MG1}$ matches (follows) the target first electric motor torque $T_{MG1}$* and that the actual first electric motor rotation speed $N_{MG1}$ matches (follows) the target first electric motor rotation speed $N_{MG1}$*. As described above, the engine operating point control means 70 provides the engine operating point control.

Matching the actual first electric motor rotation speed $N_{MG1}$ with the target first electric motor rotation speed $N_{MG1}$* corresponds to matching the actual engine rotation speed Ne with the target engine rotation speed Ne*.

The engine operating point control means 70 transmits output torque $T_{MG2}$ of the second electric motor MG2 (hereinafter referred to as second electric motor torque $T_{MG2}$) to the drive wheels 58 in the engine operating point control. Although the engine operating point control means 70 basically supplies electric power generated by the first electric motor MG1 directly to the second electric motor MG2 to drive the second electric motor MG2 in this case, if the charge request is made, the engine operating point control means 70 calculates the target engine output Pe* increased by the requested charging power to be stored in the electric storage device 36 in accordance with the charge request and supplies to the second electric motor MG2 a remaining portion of the electric power generated by the first electric motor MG1 after subtracting the electric power to be stored into the electric storage device 36, thereby driving the second electric motor MG2. Since the engine operating point control causes all or a portion of the electric power generated by the first electric motor MG1 to be consumed by the second electric motor MG2, the second electric motor torque $T_{MG2}$ is torque corresponding to the first electric motor torque $T_{MG1}$ and, if the consumed electric power in the second electric motor MG2 is suppressed, the first electric motor torque $T_{MG1}$ is indirectly suppressed in this relationship. Therefore, in the engine operating point control, the adjustment of the first electric motor torque $T_{MG1}$ may be considered as the adjustment of the power transmitted through the electric path and as the adjustment of the second electric motor torque $T_{MG2}$.

Figure 10:
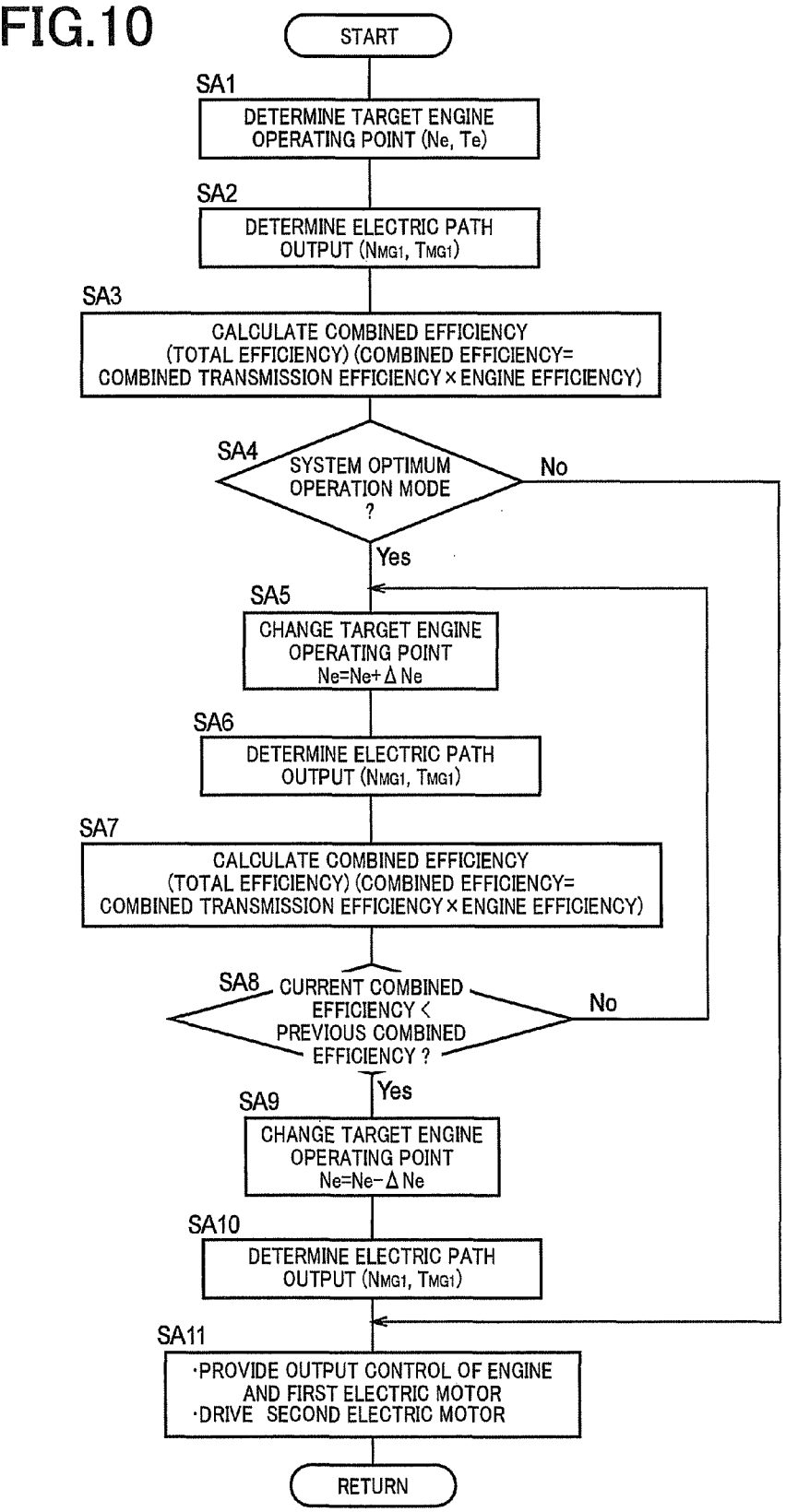
FIG. 10 is a flowchart for explaining a main portion of the control operation of the electronic control device in FIG. 3, i.e., the control operation of determining the engine operating point by utilizing the continuously variable transmission operation of the continuously variable transmission.

FIG. 10 is a flowchart for explaining a main portion of the control operation of the electronic control device 40, i.e., the control operation of determining the operating point of the engine 12 by utilizing the continuously variable transmission operation of the continuously variable transmission 60 and is repeatedly executed with an extremely short cycle time, for example, on the order of a few msec to a few tens of msec. The control operation depicted in FIG. 10 is performed solely or concurrently with another control operation. Steps (hereinafter, "step" will be omitted) SA1 to SA3 and SA5 to SA11 correspond to the engine operating point control means 70 and SA4 corresponds to the operation mode determining means 68.

First, at SA1, a target engine output (necessary engine power) Pe* is calculated based on the accelerator opening degree Acc and the vehicle speed V from a predetermined relationship. The target engine output Pe* may be calculated to be larger by the charging power if the electric storage device 36 is charged, or may be calculated to be smaller by the discharging power if the electric storage device 36 is discharged. At SA1, a target engine operating point is determined as an operating point (e.g., the point P05 of FIG. 9) of the engine 12 at which the calculated target engine output Pe* is achieved on the engine minimum fuel consumption rate line $L_{FL}$ as depicted in FIG. 9. SA1 is followed by SA2.

At SA2, as exemplarily illustrated in FIG. 9, the first electric motor torque $T_{MG1}$ is calculated and determined based on the target engine operating point (e.g., the point P05) determined at SA1. In other words, electric path output (e.g., in kW) transmitted through the electric path corresponding to the target engine operating point is calculated based on the first, electric motor torque $T_{MG1}$ and the first electric motor rotation speed $N_{MG1}$ (=engine rotation speed Ne). Mechanical path output (e.g., in kW) transmitted through the mechanical path corresponding to the target engine operating point is calculated based on the pump torque Tp and the pump rotation speed Np (=engine rotation speed Ne). SA2 is followed by SA3.

At SA3, the combined transmission efficiency $\eta_{CVT}$ based on the target engine operating point determined at SA1 is calculated from the relationship between each of the transmission efficiency $\eta_{MC}$ of the mechanical path and the transmission efficiency $\eta_{EL}$ of the electric path, and the speed ratio e as depicted in FIG. 8 based on the turbine rotation speed Nt detected by the turbine rotation speed sensor 52, the engine rotation speed Ne indicated by the target engine operating point, and the electric path output and the mechanical path output calculated at SA2. The engine efficiency $\eta_{ENG}$ based on the target engine operating point determined at SA1 is also calculated. The product of the combined transmission efficiency $\eta_{CVT}$ and the engine efficiency $\eta_{ENG}$ is calculated as the total efficiency (combined efficiency) $\eta_{TOTAL}$. SA3 is followed by SA4.

At SA4, it is determined whether the system optimum operation mode is selected. If the determination at SA4 is affirmative, i.e., if the system optimum operation mode is selected, the operation goes to SA5. On the other hand, if the determination at SA4 is negative, the operation goes to SA11.

At SA5, the engine rotation speed Ne indicated by the target engine operating point is increased by a predetermined change amount ΔNe to determine a new target engine operating point. This stepwise change in the target engine operating point is made such that the target engine output Pe* calculated at SA1 is not changed. Therefore, the engine torque Te indicated by the target engine operating point is changed along with the change in the engine rotation speed Ne indicated by the target engine operating point. The target engine operating point before the change at SA5 is referred to as a previous target engine operating point and the target engine operating point after the change is referred to as a current target engine operating point. SA5 is followed by SA6.

At SA6, as is the case with SA2, the first electric motor torque $T_{MG1}$ is calculated based on the current target engine operating point, and the electric path output and the mechanical path output corresponding to the current target engine operating point are calculated. SA6 is followed by SA7.

At SA7, as is the case with SA3, the combined transmission efficiency $\eta_{CVT}$ based on the current target engine operating point is calculated and the engine efficiency $\eta_{ENG}$ based on the current target engine operating point is calculated. The product of the combined transmission efficiency $\eta_{CVT}$ and the engine efficiency $\eta_{ENG}$ is calculated as the total efficiency (combined efficiency) $\eta_{TOTAL}$ (referred to as current combined efficiency). Previous combined efficiency, i.e., the total efficiency (combined efficiency) $\eta_{TOTAL}$ based on the previous target engine operating point, is stored in advance for determination at SA8. SA7 is followed by SA8.

At SA8, it is determined whether the previous combined efficiency is greater than the current combined efficiency. If the determination at SA8 is affirmative, i.e., if the previous combined efficiency is greater than the current combined efficiency, the operation goes to SA9. On the other hand, if the determination at SA8 is negative, the operation goes to SA5.

At SA9, the target engine operating point is returned to the previous target engine operating point. In other words, the engine rotation speed Ne indicated by the current target engine operating point determined at SA5 is reduced by the predetermined change amount ΔNe to determine a new target engine operating point. In this case, as is the case with SA5, the engine torque Te indicated by the target engine operating point is also changed, i.e., returned to the previous torque, such that the target engine output Pe* is not changed. SA9 is followed by SA10.

At SA10, as is the case with SA2, the first electric motor torque $T_{MG1}$ is calculated based on the target engine operating point newly determined at SA9, and the electric path output and the mechanical path output corresponding to the target engine operating point newly determined at SA9 are calculated. SA10 is followed by SA11.

At SA11, the output control of the engine 12 and the first electric motor MG1 is provided such that an actual operating point of the engine 12 indicated by the actual engine rotation speed Ne and engine torque Te matches, for example, follows, the finally determined target engine operating point. The second electric motor torque $T_{MG2}$ is transmitted to the drive wheels 58. Although the electric power generated by the first electric motor MG1 is directly supplied to the second electric motor MG2 to drive the second electric motor MG2 in this case, if the electric storage device 36 is charged, the second electric motor MG2 is supplied with a remaining portion of the electric power generated by the first electric motor MG1 after subtracting the electric power to be stored into the electric storage device 36, so as to drive the second electric motor MG2.

This example has the following effects (A1) to (A4). (A1) According to this example, the first electric motor MG1, the second electric motor MG2, and the torque converter 16 make up the continuously variable transmission 60 as a whole and the engine operating point control means 70 provides the engine operating point control in which the first electric motor torque $T_{MG1}$ is adjusted to control the operating point of the engine 12 during the engine running. In the engine operating point control, the second electric motor torque $T_{MG2}$ is transmitted to the drive wheels 58. Therefore, since the continuously variable transmission operation of the continuously variable transmission 60 can be performed by adjusting the first electric motor torque $T_{MG1}$ (basically, regenerative torque) and the continuously variable transmission operation of the continuously variable transmission 60 enables the operating point of the engine 12 to be controlled without being constrained by the turbine rotation speed Nt, the engine 12 can be driven at an operating point optimal for the fuel efficiency improvement (fuel efficiency optimum point), for example, and the vehicle fuel efficiency can be improved.

(A2) According to this example, as depicted in FIG. 5, the engine operating point control means 70 adjusts the first electric motor torque $T_{MG1}$ such that the sum of the engine torque Te and the first electric motor torque $T_{MG1}$ is balanced with the pump torque Tp that is the input-side load torque of the torque converter 16. Therefore, the first electric motor torque $T_{MG1}$ can easily be adjusted based on the characteristics of the torque converter 16.

(A3) According to this example, if the operation mode determining means 68 determines that the system optimum operation mode is selected, the engine operating point control means 70 shifts the operating point of the engine 12 to the side of greater total efficiency $\eta_{TOTAL}$ that is the product of the combined transmission efficiency $\eta_{CVT}$ and the engine efficiency $\eta_{ENG}$. Therefore, as compared to the case that the operating point of the engine 12 is not changed depending on the total efficiency $\eta_{TOTAL}$, the efficiency of the vehicle drive device 10 is increased as a whole and the vehicle fuel efficiency can be improved.

(A4) According to this example, if the operation mode determining means 68 determines that the system optimum operation mode is not selected, the engine operating point control means 70 controls the operating point of the engine 12 such that the operating point of the engine 12 is located along the engine minimum fuel consumption rate line $L_{FL}$ and that the target engine output Pe* is achieved. Therefore, a rise in the fuel consumption rate of the engine 12 can be suppressed by the continuously variable transmission operation of the continuously variable transmission 60.

As described above, since the vehicle drive device 10 adjusts the first electric motor torque $T_{MG1}$ to provide the engine operating point control while using both the electric path and the mechanical path as the transmission path transmitting the power of the engine 12, the vehicle fuel efficiency can be improved. However, if the engine operating point control is implemented with priority given to the fuel efficiency improvement, the respective transmission path characteristics of the electric path and the mechanical path may not be utilized, and various requests may not be satisfied.

Specifically, an acceleration feeling is easily acquired from the power transmission through the mechanical path by utilizing the torque amplification effect in the torque converter 16. The power transmission through the mechanical path easily causes the operating oil flowing in the torque converter 16 to generate heat from an energy loss due to hydraulic transmission. On the other hand, by using the electric path, the operating point of the engine 12 can be controlled without being constrained by the turbine rotation speed Nt. At the transmission rates $RTO_{PEL}$ and $RTO_{PMC}$ of the power transmitted through the electric path and the mechanical path, respectively, set with top priority given to the fuel efficiency improvement, it becomes difficult to satisfy various requests other than the fuel efficiency improvement, such as an acceleration request and a warm-up request to the vehicle drive device 10 (e.g., a device such as the automatic transmission 18 through which the operating oil (fluid) of the torque converter 16 circulates), which may deteriorate drivability (e.g., acceleration feeling) or delay warm-up of the vehicle drive device 10. In the following description, discussion will be made on changing the transmission rates $RTO_{PEL}$ and $RTO_{PMC}$ of the power through the respective transmission paths set with top priority given to the fuel efficiency improvement (e.g., nominal transmission rates $RTO_{PEL}$ and $RTO_{PMC}$ set by the control operation of FIG. 10 descried above) so as to satisfy various requests other than the fuel efficiency improvement when the engine operating point control is provided.

Figure 11:
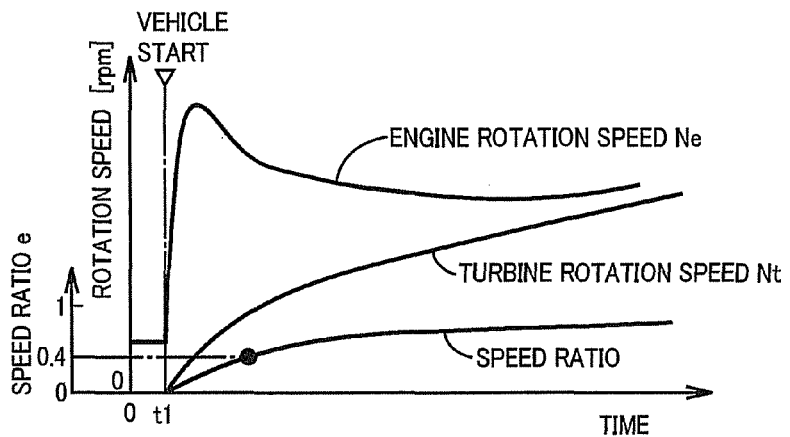
FIG. 11 is a diagram of an example of a change in the speed ratio at the start of a vehicle.

FIG. 11 is a diagram of a change in the speed ratio e at the start of a vehicle. In FIG. 11, when the vehicle starts, the turbine rotation speed Nt starts from zero (see time point t1) and, as the turbine rotation speed Nt increases in accordance with an increase in the vehicle speed V, the engine rotation speed Ne racing up due to accelerator-on decreases and, therefore, the speed ratio e increases from zero toward one. Therefore, at the start of a vehicle, the vehicle running is performed in a range with a smaller speed ratio e, for example, as compared to during steady running with a constant accelerator opening degree Acc.

Figure 12:
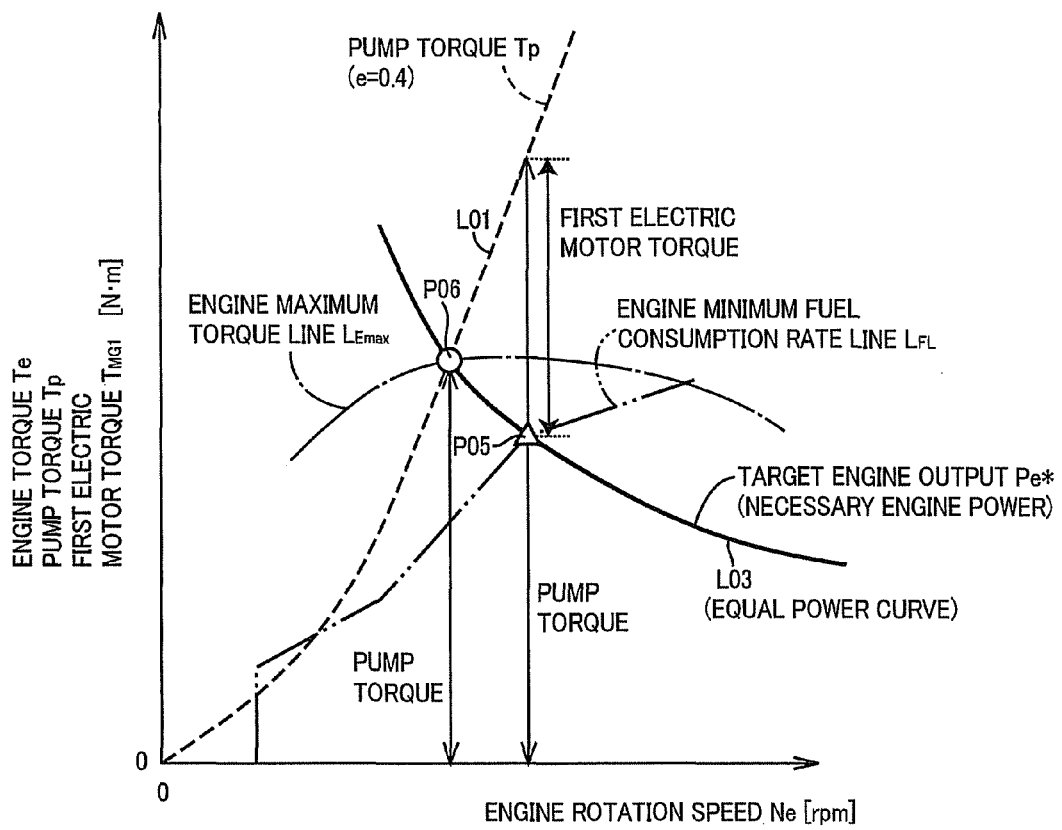
FIG. 12 is a diagram indicating an example of the case of moving the engine operating point passively determined at the start with an accelerator fully opened onto the engine minimum fuel consumption rate line through the engine operating point control in the same coordinate system as FIG. 9.

FIG. 12 is a diagram of the case of moving the operating point of the engine 12 passively determined at the start with an accelerator fully opened onto the engine minimum fuel consumption rate line $L_{FL}$ through the engine operating point control in the same coordinate system as FIG. 9. In FIG. 12, an engine operating point P06 is an operating point of the engine 12 passively determined when power is not transmitted through the electric path, at the time of start with the accelerator fully opened, i.e., at the fully-opened throttle valve opening degree $\eta_{TH}$ (referred to as WOT) (at the time of the WOT start), at the point of the balance between the pump torque Tp corresponding to the engine rotation speed Ne when the speed ratio e is 0.4 (see, e.g., a block circle of FIG. 11) and the engine torque Te having a value on an engine maximum torque line $L_E$max corresponding to WOT. If such an engine operating point P06 is moved to an engine operating point P05 at which the target engine output Pe* is achieved on the engine minimum fuel consumption rate line $L_{FL}$, the pump torque Tp becomes larger than the engine torque Te at the engine operating point P05, and the pump torque Tp is total torque acquired by adding the first electric motor torque $T_{MG1}$ (>0) in the power running state to the engine torque Te. In such a case, the power circulation state occurs in which the second electric motor MG2 generates electricity while the first electric motor MG1 consumes electric power and, for example, the electric power exchanged between the electric motors MG1 and MG2 becomes larger and may not be supported by the rated output of the first electric motor MG1, for example. If the pump torque Tp is smaller than the engine torque Te at the engine operating point P05 as depicted in FIG. 9, the pump torque Tp is total torque acquired by adding the first electric motor torque $T_{MG1}$ (<0) in the electric generation state to the engine torque Te, resulting in a power shunt state in which the first electric motor MG1 generates electricity while the second electric motor MG2 consumes electric power.

Figure 13:
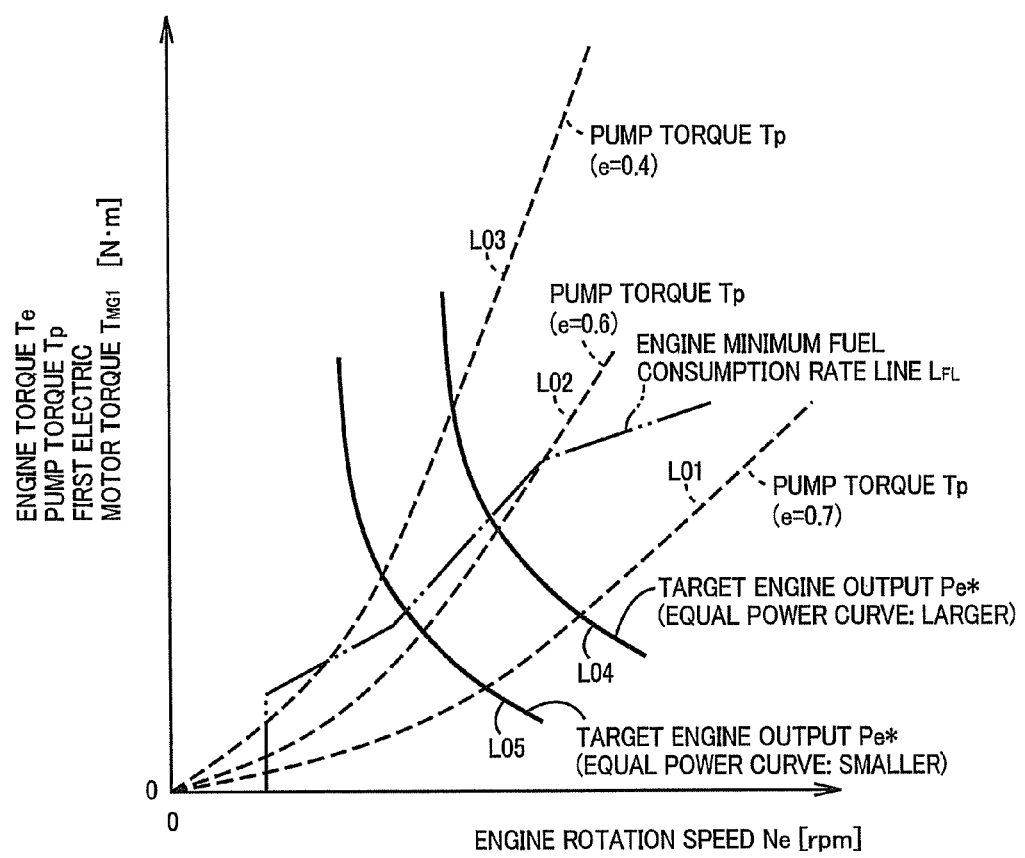
FIG. 13 is a diagram indicating an example of pump torques of respective speed ratios in the same coordinate system as FIG. 12.

FIG. 13 is a diagram of pump torques Tp of respective speed ratios e in the same coordinate system as FIG. 12. In FIG. 13, if the target engine operating point is defined as the engine operating point at which the target engine output Pe* is achieved on the engine minimum fuel consumption rate line $L_{FL}$, the power circulation state occurs when the pump torque Tp is located on the higher torque side (lower engine rotation side) as compared to the engine minimum fuel consumption rate line $L_{FL}$. The power shunt state occurs when the pump torque Tp is located on the lower torque side (higher engine rotation side) as compared to the engine minimum fuel consumption rate line $L_{FL}$. Therefore, when the speed ratio e is smaller, or when the target engine output Pe* is higher, i.e., a requested load considered as an acceleration request amount (e.g., an accelerator opening degree Acc, an intake air amount, and required output torque (target output torque) calculated based on the accelerator opening degree Acc and the vehicle speed V) is higher, the power circulation state more easily occurs.

Therefore, if the power circulation state occurs as exemplarily illustrated in FIGS. 12 and 13, i.e., in the case of a smaller speed ratio e and a higher power range, the power is preferably transmitted mainly by the power transmission through the mechanical path, i.e., the hydraulic transmission, so as to utilize the characteristic of the hydraulic transmission capable of ensuring a larger power transmission amount. From another viewpoint, if the requested load considered as an acceleration request amount (i.e., the required output torque or the accelerator opening degree Acc) is higher, the power is preferably transmitted mainly through the hydraulic transmission so as to obtain a better acceleration feeling by utilizing the torque amplification effect of the torque converter 16. Since the occurrence of the power circulation state may significantly reduce the combined transmission efficiency $\eta_{CVT}$ (see FIG. 8), it may be thought that the power is preferably transmitted mainly through the hydraulic transmission in such a case as when the power circulation state is generated.

Figure 14:
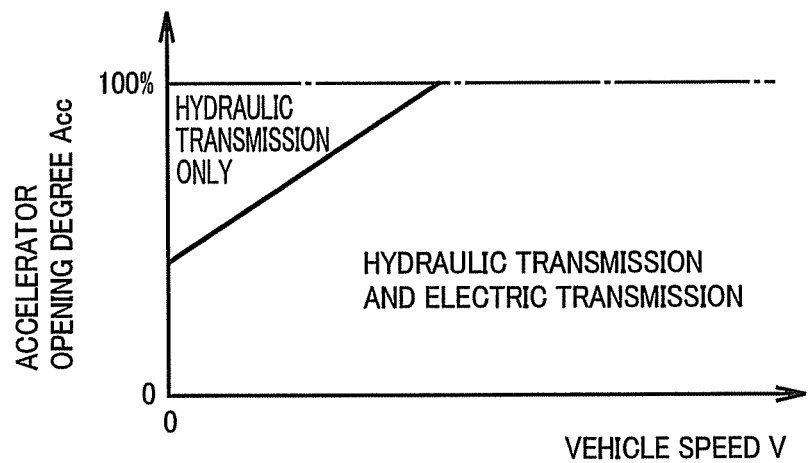
FIG. 14 is a diagram indicating an example of a transmission rate change map A obtained and stored in advance for changing the transmission rates through the electric path and the mechanical path.

FIG. 14 depicts an example of a transmission rate change map A obtained and stored in advance for changing the transmission rates $RTO_{PEL}$ and $RTO_{PMC}$ of the power through the respective transmission paths of the electric path and the mechanical path when the engine operating point control is provided, in such a manner as to reflect the concept that the hydraulic transmission should be prioritized in the case of a smaller speed ratio e and a higher power range. In FIG. 14, the transmission rate change map A has ranges for determining a change in the transmission rates $RTO_{PEL}$ and $RTO_{PMC}$ set in two-dimensional coordinates of a vehicle speed axis and a required output torque axis (or an accelerator opening degree axis). In FIG. 14, a range indicated by "hydraulic transmission and electric transmission" is a range for transmitting power through the hydraulic transmission along with the electric transmission and is a range for providing the engine operating point control at the nominal transmission rates $RTO_{PEL}$ and $RTO_{PMC}$ set with top priority given to the fuel efficiency improvement. A range indicated by "hydraulic transmission only" is a low vehicle speed and a high acceleration request amount range for transmitting power preferentially through the hydraulic transmission because of the smaller speed ratio e and the higher power range, and is a range for providing the engine operating point control only with the hydraulic transmission by changing the nominal electric path transmission rate $RTO_{PEL}$ to "0%" and the nominal mechanical path transmission rate $RTO_{PMC}$ to "100%" so as to prioritize an acceleration request over the fuel efficiency improvement because of a relatively greater acceleration request amount.

Figure 15:
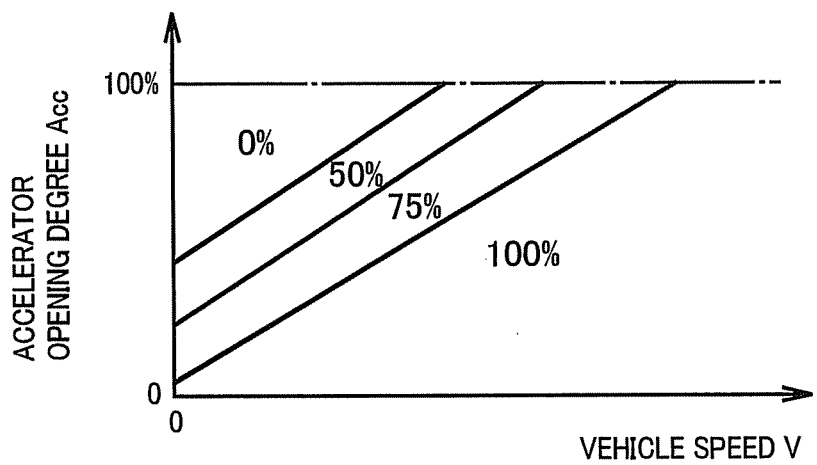
FIG. 15 is a diagram indicating an example of a transmission rate change map B obtained and stored in advance for changing the transmission rates through the electric path and the mechanical path and is the example different from the transmission rate change map A in FIG. 14.

As described above, in FIG. 14, the ranges are divided by the presence of the electric transmission. To speak of extremes, the ranges are divided depending on whether top priority is given to the fuel efficiency improvement or the acceleration request. In such as example, instead of giving top priority to one of the fuel efficiency improvement and the acceleration request, an intermediate range may be provided such that both are satisfied to some extent. FIG. 15 depicts an example of a transmission rate change map B obtained and stored in advance for changing the transmission rates $RTO_{PEL}$ and $RTO_{PMC}$ of the power through the respective transmission paths of the electric path and the mechanical path as is the case with the transmission rate change map A of FIG. 14. FIG. 15 depicts a setting of a percentage of the allowable transmission rate $RTO_{PEL}$ relative to the nominal electric path transmission rate $RTO_{PEL}$ set with top priority given to the fuel efficiency improvement, i.e., a percentage of an electric power amount that may be transmitted relative to an electric power amount determined with top priority given to the fuel efficiency improvement. In particular, the percentages "0%", "50%", "75%", and "100%" set in respective ranges in FIG. 15 are values by which the nominal electric path transmission rate $RTO_{PEL}$ is multiplied, and a change to the calculated transmission rate $RTO_{PEL}$ (=nominal transmission rate $RTO_{PEL}$×each of the percentages) is made in each of the ranges to provide the engine operating point control. Therefore, the range indicated by the percentage "0%" in FIG. 15 corresponds to the range indicated by "hydraulic transmission only" in FIG. 14, and the range indicated by the percentage "100%" in FIG. 15 corresponds to the range indicated by "hydraulic transmission and electric transmission" in FIG. 14. The ranges indicated by the percentages "50%" and "75%" in FIG. 15 are ranges in which power is transmitted through the hydraulic transmission along with the electric transmission; however, the nominal electric path transmission rate $RTO_{PEL}$ is changed to be relatively small in these ranges for providing the engine operating point control. Since the electric path transmission rate $RTO_{PEL}$ is made smaller from the nominal value, it is needless to say that the mechanical path transmission rate $RTO_{PMC}$ is accordingly made larger from the nominal value.

As described above, if an acceleration request amount considered as one of the various request amounts other than the fuel efficiency improvement is larger, a proportion of the power transmitted through the electric path is reduced, i.e., a proportion of the power transmitted through the mechanical path is increased, as compared to when the acceleration request amount is smaller.

Additionally, considering that the heat is easily generated by the operating oil in the torque converter 16 from an energy loss due to the hydraulic transmission, if the operating oil in the automatic transmission 18 and the lockup clutch L/C is at relatively low oil temperature, the power is preferably transmitted mainly by the power transmission through the mechanical path, i.e., the hydraulic transmission. In particular, if a warm-up request to the vehicle drive device 10 is present that is one of the various request amounts other than the fuel efficiency improvement, the power is preferably transmitted mainly by the hydraulic transmission so as to promote warm-up of the vehicle drive device 10. Therefore, in this example, if the warm-up request to the vehicle drive device 10 is present, a proportion of the power transmitted through the electric path is reduced, i.e., a proportion of the power transmitted through the mechanical path is increased, as compared to when the warm-up request is absent. With regard to a method of changing a proportion of the power transmitted through each of the transmission paths, for example, if the warm-up request is absent, the engine operating point control is provided at the nominal transmission rates $RTO_{PEL}$ and $RTO_{PMC}$ set with top priority given to the fuel efficiency improvement, while if the warm-up request is present, the nominal electric path transmission rate $RTO_{PEL}$ is changed to "0%" and the nominal mechanical path transmission rate $RTO_{PMC}$ is changed to "100%" so as to provide the engine operating point control only through the hydraulic transmission. Alternatively, If the operating oil temperature $TH_{OIL}$, i.e., the temperature of the operating oil of the torque converter 16, the automatic transmission 18, etc., is lower, the percentage of the allowable transmission rate $RTO_{PEL}$ relative to the nominal electric path transmission rate $RTO_{PEL}$ may be changed to be smaller (e.g., to "0%", "50%", "75%", and "100%") such that the engine operating point control is provided at the changed transmission rate $RTO_{PEL}$ (=nominal transmission rate $RTO_{PEL}$×each of the percentages).

As described above, in this example, when the engine operating point control is provided, a proportion (the transmission rates $RTO_{PEL}$ and $RTO_{PMC}$) of the power transmitted through the power transmission via the electric path and the power transmission via the mechanical path is changed based on various request amounts (e.g., the fuel efficiency improvement, the acceleration request amount, and the presence of the warm-up request).

More specifically, returning to FIG. 3, the electronic control device 40 further includes a request amount reading means 72 as a request amount reading portion, a request amount determining means 74 as a request amount determining portion, and an electric path amount setting means 76 as an electric path amount setting portion.

The request amount reading means 72 reads various request amounts other than the fuel efficiency improvement for determination of changing the transmission rates $RTO_{PEL}$ and $RTO_{PMC}$ of the power through the transmission paths. Specifically, for example, if the request amount is the acceleration request amount, the request amount reading means 72 reads a value of the accelerator opening degree Acc. For example, if the request amount is the presence of the warm-up request to the vehicle drive device 10, the request amount reading means 72 reads a value of the operating oil temperature $TH_{OIL}$.

The request amount determining means 74 determines whether the request amount read by the request amount reading means 72 is larger than a predetermined request amount. This predetermined request amount is a request amount determination value obtained and set in advance for determining that a request amount other than the fuel efficiency improvement is so large that a request other than the fuel efficiency improvement must be satisfied, for example. Specifically, if the request amount is the acceleration request amount, the request amount determining means 74 determines whether the acceleration request amount is larger, i.e., whether the request amount is larger than the predetermined request amount based on whether the vehicle state is in a range where the nominal electric path transmission rate $RTO_{PEL}$ should be changed, for example, based on whether the vehicle state indicated by the vehicle speed V and the accelerator opening degree Acc is in the range indicated by "hydraulic transmission only" (or any of the ranges indicated by "0%", "50%", and "75%") in the transmission rate change map A (or the transmission rate change map B) depicted in FIG. 14 (or FIG.

15), for example. If the request amount is the presence of the warm-up request to the vehicle drive device 10, the request amount determining means 74 determines whether the request amount is larger than the predetermined request amount based on whether the warm-up request is present. The request amount determining means 74 determines whether the warm-up request is present based on whether the operating oil temperature $TH_{OIL}$ is lower than a predetermined oil temperature, for example. The predetermined oil temperature is a low oil temperature determination value obtained and stored in advance for determining that the operating oil temperature $TH_{OIL}$ is so low that the warm-up of the vehicle drive device 10 must be promoted rather than the fuel efficiency improvement, for example.

If the request amount determining means 74 determines that the request amount is smaller than the predetermined request amount, the electric path amount setting means 76 sets the transmission rates $RTO_{PEL}$ and $RTO_{PMC}$ of power through the transmission paths to the nominal transmission rates $RTO_{PEL}$ and $RTO_{PMC}$ with top priority given to the fuel efficiency improvement. On the other hand, if the request amount determining means 74 determines that the request amount is larger than the predetermined request amount, the electric path amount setting means 76 changes the nominal transmission rates $RTO_{PEL}$ and $RTO_{PMC}$ depending on the request amount, i.e., changes an electric path amount that is the power transmitted through the electric path and a mechanical path amount that is the power transmitted through the mechanical path. Specifically, for example, if the request amount determining means 74 determines that the vehicle state is in a range where the nominal electric path transmission rate $RTO_{PEL}$ should be changed, the electric path amount setting means 76 changes the nominal electric path transmission rate $RTO_{PEL}$ to "0%" or changes the nominal electric path transmission rate $RTO_{PEL}$ to a transmission rate $RTO_{PEL}$ set smaller than the nominal electric path transmission rate $RTO_{PEL}$ in the range. For example, if the request amount determining means 74 determines that the warm-up request to the vehicle drive device 10 is present, the electric path amount setting means 76 changes the nominal electric path transmission rate $RTO_{PEL}$ to "0%" or changes the nominal electric path transmission rate $RTO_{PEL}$ to a transmission rate $RTO_{PEL}$ set smaller than the nominal electric path transmission rate $RTO_{PEL}$ depending on the operating oil temperature $TH_{OIL}$. Since the electric path transmission rate $RTO_{PEL}$ is changed from the nominal value, it is needless to say that the mechanical path transmission rate $RTO_{PMC}$ is accordingly changed from the nominal value.

Figure 16:
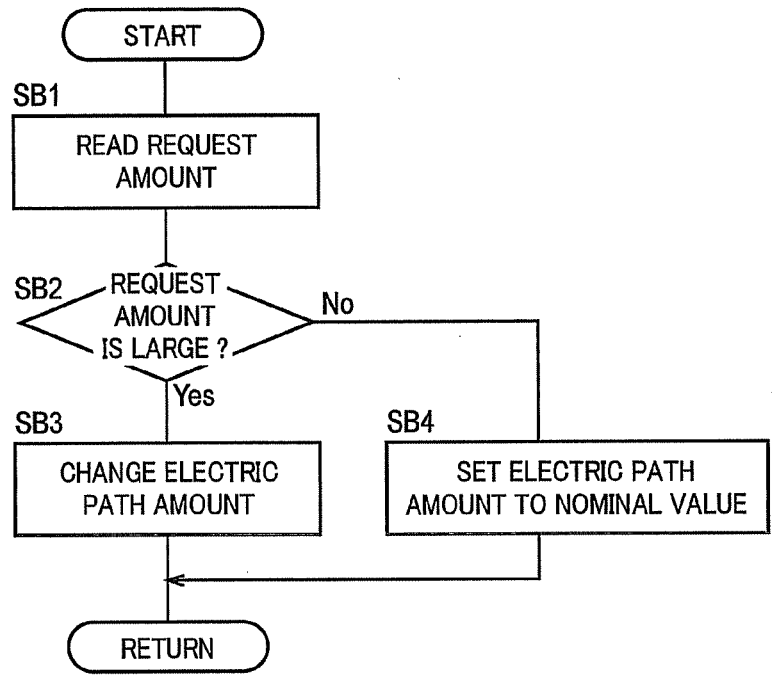
FIG. 16 is a flowchart for explaining a main portion of the control operation of the electronic control device in FIG. 3, i.e., the control operation of realizing various requests other than the fuel efficiency when the engine operating point is controlled by adjusting the first electric motor torque.

FIG. 16 is a flowchart for explaining a main portion of the control operation of the electronic control device 40, i.e., the control operation of realizing various requests other than the fuel efficiency when the engine operating point is controlled by adjusting the first electric motor torque $T_{MG1}$ and is repeatedly executed with an extremely short cycle time, for example, on the order of a few msec to a few tens of msec. The control operation depicted in FIG. 16 is performed solely or concurrently with another control operation. Step (hereinafter, "step" will be omitted) SB1 corresponds to the request amount reading means 72; SB2 corresponds to the request amount determining means 74; and SB3 and SB4 correspond to the electric path amount setting means 76.

First, at SB1, for example, various request amounts other than the fuel efficiency improvement are read. For example, if the request amount is the acceleration request amount, a value of the accelerator opening degree Acc is read. For example, if the request amount is the presence of the warm-up request to the vehicle drive device 10, a value of the operating oil temperature $TH_{OIL}$ is read. SB1 is followed by SB2.

At SB2, for example, it is determined whether the request amount read at SB 1 is larger than the predetermined request amount. For example, if the request amount is the acceleration request amount, it is determined whether the acceleration request amount is larger based on whether the vehicle state is in a range where the nominal electric path transmission rate $RTO_{PEL}$ should be changed. For example, if the request amount is the presence of the warm-up request to the vehicle drive device 10, it is determined whether the warm-up request is present based on whether the operating oil temperature $TH_{OIL}$ is lower than the predetermined oil temperature. If the determination at SB2 is affirmative, i.e., if the request amount is larger than the predetermined request amount, the operation goes to SB3. On the other hand, if the determination at SB2 is negative, i.e., if the request amount is smaller than the predetermined request amount, the operation goes to SB4.

At SB3, the nominal transmission rates $RTO_{PEL}$ and $RTO_{PMC}$ are changed depending on the request amount read at SB 1. For example, if it is determined that the acceleration request amount is larger at SB2, the nominal electric path transmission rate $RTO_{PEL}$ is changed to "0%" or the nominal electric path transmission rate $RTO_{PEL}$ is changed to a transmission rate $RTO_{PEL}$ set smaller than the nominal electric path transmission rate $RTO_{PEL}$ in the range. Therefore, the electric path amount is reduced and the mechanical path amount is increased. This leads to the avoidance or suppression of the power transmission through the electric path having a possibility of relatively large exchanged electric power, and the acceleration performance is improved by the torque amplification effect of the torque converter 16. For example, if it is determined at SB2 that the warm-up request to the vehicle drive device 10 is present, the nominal electric path transmission rate $RTO_{PEL}$ is changed to "0%" or the nominal electric path transmission rate $RTO_{PEL}$ is changed to a transmission rate $RTO_{PEL}$ set smaller than the nominal electric path transmission rate $RTO_{PEL}$ depending on the operating oil temperature $TH_{OIL}$. Therefore, the electric path amount is reduced and the mechanical path amount is increased. This leads to an increase in the power transmission through the mechanical path, which increases the energy loss due to the hydraulic transmission, thereby prompting the warm-up of the vehicle drive device 10.

At SB4, the transmission rates $RTO_{PEL}$ and $RTO_{PMC}$ of power through the transmission paths are set to the nominal transmission rates $RTO_{PEL}$ and $RTO_{PMC}$ with top priority given to the fuel efficiency improvement.

As described above, according to this example, when the engine operating point control is provided by adjusting the first electric motor torque $T_{MG1}$, a proportion (the transmission rates $RTO_{PEL}$ and $RTO_{PMC}$) of the power transmitted by the power transmission through the electric path and the power transmission through the mechanical path is changed based on various request amounts (e.g., the fuel efficiency improvement, the acceleration request amount, and the presence of the warm-up request) and, therefore, the respective characteristics of the mechanical path and the electric path are effectively brought out to satisfy the various request amounts. Therefore, when the engine operating point control is provided, various request amounts other than the fuel efficiency improvement can be realized.

According to this example, if the acceleration request amount is larger, the proportion of the power transmitted through the mechanical path is increased as compared to when the acceleration request amount is smaller and, therefore, if the acceleration request amount is relatively larger, the torque amplification effect of the torque converter 16 can more effectively be utilized to facilitate the acquisition of an acceleration feeling and improve the acceleration performance. From another viewpoint, when the acceleration request amount is relatively larger, if the engine operating point is moved for achieving an improvement in fuel efficiency of a vehicle, a problem may occur that the electric power given/received between the first electric motor MG1 and the second electric motor MG2 tends to increase; however, by reducing the proportion of the power transmission through the electric path and increasing the proportion of the power transmission through the mechanical path where the torque amplification effect of the torque converter 16 is acquired, the given/received electric power can be suppressed and the acceleration performance can be improved. On the other hand, if the acceleration request amount is relatively smaller, the power transmission through the electric path is effectively utilized and, for example, the engine 12 can be driven at the engine operating point suitable for the fuel efficiency improvement, thereby achieving the fuel efficiency improvement of the vehicle.

According to this example, if the warm-up request to the vehicle drive device 10 is present, the proportion of the power transmitted through the mechanical path is increased as compared to when the warm-up request is absent and, therefore, if the warm-up request is present, the energy loss due to the mechanical path can be increased to facilitate a rise in the operating oil temperature $TH_{OIL}$, thereby improving the warm-up performance. In particular, if the warm-up request is present, the power transmitted through the mechanical path can be increased to make the energy loss greater, thereby promoting the warm-up. On the other hand, if the warm-up request is absent, the power transmission through the electric path is effectively utilized and, for example, the engine 12 can be driven at the engine operating point suitable for the fuel efficiency improvement, thereby achieving the fuel efficiency improvement of the vehicle.

Although an example of the present invention has been described in detail with reference to the drawings, the present invention is not limited to this example and may be implemented in other forms.

For example, although the requested load such as the required output torque, the accelerator opening degree Acc, etc., is exemplarily illustrated as an acceleration request amount that is one of the various request amounts other than the fuel efficiency improvement in the example, this is not necessarily a limitation. For example, the throttle valve opening degree $\theta_{TH}$, the intake air amount, etc., may be used instead of the accelerator opening degree Acc, or a change rate of the accelerator opening degree Acc may also be used.

Although the acceleration request amount and the presence of the warm-up request are exemplarily illustrated as the various request amounts other than the fuel efficiency improvement in the example, this is not necessarily a limitation. For example, the various request amounts may include the presence of a cooling request to the vehicle drive device 10. If this cooling request is present, for example, the proportion of the power transmitted through the mechanical path can be made smaller to reduce the energy loss due to the mechanical path, thereby suppressing the heat generation of the operating oil. In short, the present invention is applicable to any requests that should be realized in preference to the fuel efficiency improvement.

Although the automatic transmission 18 is a stepped transmission in the example, the automatic transmission 18 may be a continuously variable transmission (CVT) capable of continuously varying the gear ratio $\gamma_{AT}$.

Figure 17:
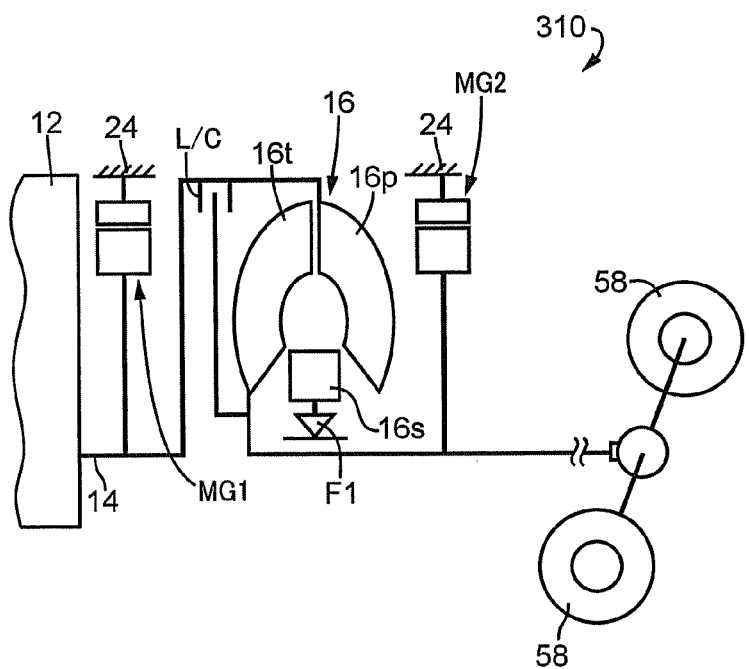
FIG. 17 is a schematic for explaining a configuration of a vehicle drive device without the automatic transmission and the schematic for explaining the configuration of the vehicle drive device different form that of FIG. 1.

Although the vehicle drive device 10 includes the automatic transmission 18 subjected to the automatic shift control in the example, a configuration without the automatic transmission 18 may be conceivable as in the case of a vehicle drive device 310 depicted in FIG. 17, for example.

Although the first electric motor MG1 is driven to perform regenerative operation and the first electric motor torque $T_{MG1}$ is generated in the negative rotation direction in the engine operating point control in the example, the power circulation state may be permitted such that the first electric motor MG1 consumes electric power while the second electric motor MG2 generates electricity, the first electric motor torque $T_{MG1}$ may be generated in the positive rotation direction in some cases.

In the example, the second electric motor MG2 is coupled to the input shaft 20 of the automatic transmission 18 as depicted in FIG. 1 and, therefore, the second electric motor MG2 is indirectly coupled via the automatic transmission 18 to the drive wheels 58; however, the second electric motor MG2 may be coupled to the output shaft 22 instead of the input shaft 20. If the second electric motor MG2 is coupled to the output shaft 22 in this way, the second electric motor MG2 and the drive wheels 58 rotate in one-to-one relationship without interruption of power transmission and, therefore, it can be said that the second electric motor MG2 is directly coupled to the drive wheels 58. The second electric motor MG2 may be a wheel-in motor built into the drive wheels 58. In this case, a total of the two second electric motors. MG2 are disposed in the left and right drive wheels 58.

In the example, the second electric motor MG2 is coupled to the drive wheels 58 that are rear wheels indirectly coupled to the engine 12 as depicted in FIG. 1; however, the engine 12 and the first electric motor MG1 may be coupled to the rear wheels as depicted in FIG. 1 while the second electric motor MG2 may directly or indirectly be coupled to front wheels instead of the rear wheels. If the second electric motor MG2 is coupled to the front wheels in this way, the front wheels are included in drive wheels. In short, the drive wheels driven by the power from the engine 12 may be wheels different from the drive wheels driven by the power from the second electric motor MG2.

Although the first electric motor torque $T_{MG1}$ is adjusted in the engine operating point control, i.e., the continuously variable transmission operation of the continuously variable transmission 60 described in the example, the first electric motor torque $T_{MG1}$ may directly be adjusted or may be adjusted as a result of adjustment of the second electric motor torque $T_{MG2}$, i.e., adjustment of the output of the second electric motor MG2, or in other words, in an indirect manner.

In the example, the power transmission is electrically performed through the electric path by giving and receiving electric power between the first electric motor MG1 and the second electric motor MG2; however, for example, the electric power generated by the first electric motor MG1 may directly be supplied to the second electric motor MG2 without via the electric storage device 36, or the electric power generated by the first electric motor MG1 may indirectly be supplied to the second electric motor MG2 in such a manner that the electric power generated by the first electric motor MG1 is once stored in the electric storage device 36 and then supplied from the electric storage device 36 to the second electric motor MG2. The same applies to the time of the power circulation.

In the example, the power transmission is electrically performed through the electric path in the engine operating point control by giving and receiving electric power between the first electric motor MG1 and the second electric motor MG2;

however, for example, the second electric motor MG2 may be driven by the supply of electric power from the electric storage device 36, or the supply of electric power from the electric storage device 36 along with the supply of electric power generated by the first electric motor MG1. The same applies to the electric power supply to the first electric motor MG1 in the case of power running of the first electric motor MG1 at the time of the power circulation.

Although the first electric motor MG1 is directly coupled to the pump impeller 16p of the torque converter 16 as depicted in FIG. 1 in the example, the first electric motor MG1 may indirectly be coupled to the pump impeller 16p via a transmission, a clutch, or an electric belt.

Although the vehicle drive device 10 includes the electric storage device 36 in the example, the electric storage device 36 may not be included.

Although SA3 is followed by SA4 in the flowchart of FIG. 10 in the example, either of these steps may come first and, for example, in the flowchart, after SA2 is followed by SA4, if the determination at SA4 is affirmative, the operation may go to SA3, and SA3 may be followed by SA5.

Although the engine rotation speed Ne indicated by the target engine operating point is increased by the predetermined change amount ΔNe to determine a new target engine operating point at SA5 of the flowchart of FIG. 10 in the example, the engine rotation speed Ne may be decreased by the predetermined change amount ΔNe to determine a new target engine operating point. In such a case, at SA9 of FIG. 10, the engine rotation speed Ne indicated by the current target engine operating point determined at SA5 is increased by the predetermined change amount ΔNe to determine a new target engine operating point.

With regard to the flowchart depicted in FIG. 10 of the example, it is conceivable that the flowchart may not include steps SA3 to SA10 so that SA11 is executed after SA2.

Although the target engine operating point is set on the engine minimum fuel consumption rate line $L_{FL}$ as indicated by, for example, the point P05 in FIGS. 9 and 12 in the example, it is conceivable that the target engine operating point is set out of the engine minimum fuel consumption rate line $L_{FL}$.

Although the vehicle can perform the motor running in the example, the vehicle may always run by performing the engine running.

Although the torque converter 16 includes the lockup clutch L/C in the example, the lockup clutch L/C is released in the continuously variable transmission operation of the continuously variable transmission 60 and, therefore, the lockup clutch L/C may not be included.

Although the automatic transmission 18 is shifted to Rev1 or Rev2 depicted in FIG. 2 and the input shaft 20 of the automatic transmission 18 is rotated in the positive rotation direction when the vehicle is caused to run backward in the example, the vehicle may be caused to run backward by shifting the automatic transmission 18 to any one of 1st to 8th depicted in FIG. 2 and driving the second electric motor MG2 in the negative rotation direction.

Although the vehicle drive devices 10 and 310 include the torque converter 16 as a hydraulic power transmission device in the example, a fluid coupling may be disposed instead of the torque converter 16 unless the torque amplification effect is utilized in the form.

In the example, the vehicle drive devices 10 and 310 are not limited to those used in FR (front-engine rear-drive) type vehicles and may be those used in vehicles of other drive types.

Although the transmission rates $RTO_{PEL}$ and $RTO_{PMC}$ of the electric path and the mechanical path are not changed stepwise as depicted in FIG. 6 in the continuously variable transmission operation of the continuously variable transmission 60 in the example, since the transmission efficiency $\eta_{EL}$ of the electric path is higher than the transmission efficiency $\eta_{MC}$ of the mechanical path in the lower speed ratio range relative to the speed ratio indicated by the intersection point between the dashed-dotted line and the solid line as depicted in FIG. 8 while the transmission efficiency $\eta_{MC}$ of the mechanical path is higher than the transmission efficiency $\eta_{EL}$ of the electric path in the higher speed ratio range, for example, the power transmission may be performed through only the electric path in the lower speed ratio range and the power transmission may be performed through only the mechanical path in the higher speed ratio range.

In the example, if the operation mode determining means 68 determines that the system optimum operation mode is selected, the engine operating point control means 70 shifts the operating point of the engine 12 to the side of greater total efficiency $\eta_{TOTAL}$; however, instead of the total efficiency $\eta_{TOTAL}$, the operating point of the engine 12 may be shifted based on a total loss $LSS_{TOTAL}$ acquired by summing a power transmission loss $LSS_{CVT}$ when the power from the engine 12 is transmitted through the electric path and the mechanical path and a loss $LSS_{ENG}$ of the engine 12 (hereinafter referred to as an engine loss $LSS_{ENG}$). Specifically, the operating point of the engine 12 may be shifted to the side of a smaller total loss $LSS_{TOTAL}$. In this case, as compared to the case that the operating point of the engine 12 is not changed depending on the total loss $LSS_{TOTAL}$, the efficiency of the vehicle drive device 10 is increased as a whole, i.e., the total loss $LSS_{TOTAL}$ is reduced, and the vehicle fuel efficiency can be improved. The power transmission loss $LSS_{CVT}$ can be calculated based on the power input to the continuously variable transmission 60, i.e., the engine output Pe, and the combined transmission efficiency $\eta_{CVT}$, and the engine loss $LSS_{ENG}$ can be calculated based on a complete combustion engine output $Pe_{CMP}$ that is a lower heating value per unit time when the fuel supplied to the engine 12 is completely combusted, and the engine efficiency $\eta_{ENG}$.

Figure 18:
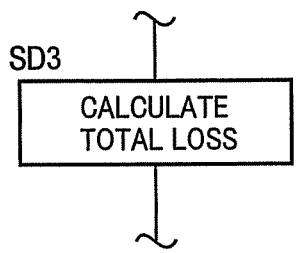
FIG. 18 is a diagram of a step replaced from SA 3 of FIG. 10 to explain a flow chart different form a flowchart in FIG. 10.
Figure 19:
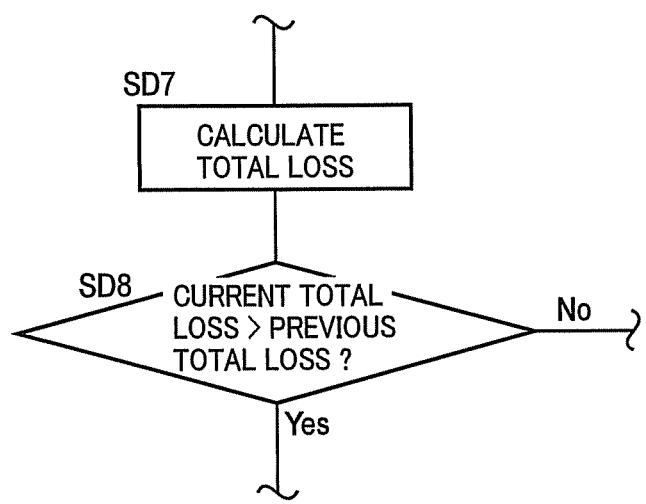
FIG. 19 is a diagram of a step replaced from SA 7, SA 8 of FIG. 10 in the flowchart explained in FIG. 18.

If the operating point of the engine 12 is shifted to the side of a smaller total loss $LSS_{TOTAL}$, as described above, in the flowchart of FIG. 10, SA3 is replaced with SD3 of FIG. 18, and SA7 and SA8 are replaced with SD7 and SD8 of FIG. 19. SD3, SD7, and SD8 correspond to the engine operating point control means 70.

Specifically describing the flowchart having SD3, SD7, and SD8 in place of SA3, SA7, and SA8 of FIG. 10, in the flowchart, SA2 of FIG. 10 is followed by SD3 of FIG. 18, and SD3 is followed by SA4 of FIG. 10. At SD3, as is the case with SA3, the combined transmission efficiency $\eta_{CVT}$ and the engine efficiency $\eta_{ENG}$ are calculated. Fuel consumption in the engine 12 is sequentially detected over time and the complete combustion engine output $Pe_{CMP}$ is calculated based on the fuel consumption per unit time. Relationship between the complete combustion engine output $Pe_{CMP}$ and the fuel consumption per unit time is empirically obtained in advance, for example. The total loss $LSS_{TOTAL}$ is then calculated based on the calculated combined transmission efficiency $\eta_{CVT}$, the engine efficiency $\eta_{ENG}$, and the complete combustion engine output $Pe_{CMP}$.

SA6 of FIG. 10 is followed by SD7 of FIG. 19. At SD7, as is the case with the SD3, the total loss $LSS_{TOTAL}$ based on the current target engine operating point (referred to as a current total loss) is calculated. A previous total loss, i.e., the total loss $LSS_{TOTAL}$ based on the previous target engine operating point, is stored in advance for determination at SD8 of FIG. 19. SD7 is followed by SD8.

At SD8, it is determined whether the previous total loss is smaller than the current total loss. If the determination at SD8 is affirmative, i.e., if the previous total loss is smaller than the current total loss, the operation goes to SA9 of FIG. 10. On the other hand, if the determination at SD8 is negative, the operation goes to SA5 of FIG. 10. Although the replacement of SA3, SA7, and SA8 with SD3, SD7, and SD8 in the flowchart of FIG. 10 makes the difference described above, the other points are the same as the flowchart of FIG. 10.

Although the example has been described in terms of the form when the request amount is the acceleration request and the form when the request amount is the presence of the warm-up request, these forms may be implemented in a mutually combined manner by setting priorities, for example.

The above description is merely an embodiment and, although not exemplarily illustrated one by one, the present invention may be implemented in variously modified and improved forms based on the knowledge of those skilled in the art without departing from the spirit thereof.

NOMENCLATURE OF ELEMENTS

The elements are: 10, 310: vehicle drive device; 12: engine; 16: torque converter (hydraulic power transmission device); 16p: pump impeller (input-side rotating element); 16t: turbine impeller (output-side rotating element); 40: electronic control device (control device); 58: drive wheels; MG1: first electric motor; and MG2 second electric motor.

The invention claimed is:

1. A control device of a vehicle drive device including a hydraulic power transmission device configured to have an input-side rotating element to which power from an engine is input and an output-side rotating element outputting power to drive wheels, a first electric motor configured to be directly or indirectly coupled to the input-side rotating element, and a second electric motor configured to be directly or indirectly coupled to the drive wheels, the vehicle drive device configured to have an electric path through which power is electrically transmitted by giving/receiving electric power between the first electric motor and the second electric motor and a mechanical path through which power is mechanically transmitted via the hydraulic power transmission device, the control device of the vehicle drive device being configured to control an operating point of the engine by adjusting a torque of the first electric motor, the control device of the vehicle drive device being configured to adjust the torque of the first electric motor such that a sum of an engine torque and the torque of the first electric motor is balanced with an input-side load torque generated in the input-side rotating element depending on a speed ratio of the hydraulic power transmission device, the input-side load torque being calculated based on an engine rotation speed indicated by a target engine operating point and a capacity coefficient of the hydraulic power transmission device depending on the speed ratio, from a predetermined equation, and the torque of the first electric motor being calculated by subtracting the engine torque indicated by the target engine operating point from the input-side load torque and to determine whether a proportion of power transmitted by power transmission through the electric path and power transmission through the mechanical path is changed by adjusting the torque of the first electric motor, based on a request amount when the operating point of the engine is controlled.

2. The control device of the vehicle drive device of claim 1, wherein the hydraulic power transmission device is a torque converter having a pump impeller that is the input-side rotating element and a turbine impeller that is the output-side rotating element, wherein the request amount is an acceleration request amount, and wherein if the acceleration request amount is larger, the proportion of the power transmitted through the mechanical path is increased as compared to when the acceleration request amount is smaller.

3. The control device of the vehicle drive device of claim 1, wherein the request amount is a presence of a warm-up request to the vehicle drive device, and wherein if the warm-up request is present, the proportion of the power transmitted through the mechanical path is increased as compared to when the warm-up request is absent.

4. The control device of the vehicle drive device of claim 1, wherein the operating point of the engine is controlled by adjusting the torque of the first electric motor such that the operating point of the engine is located along a predetermined operation curve of the engine and that a target value of engine output is achieved.

5. The control device of the vehicle drive device of claim 1, wherein the operating point of the engine is shifted to the side of greater total efficiency represented by a product of a power transmission efficiency when power from the engine is transmitted through the electric path and the mechanical path and an engine efficiency at the operating point of the engine.

* * * * *

UNITED STATES PATENT AND TRADEMARK OFFICE
CERTIFICATE OF CORRECTION

PATENT NO. : 9,132,829 B2
APPLICATION NO. : 14/129442
DATED : September 15, 2015
INVENTOR(S) : Tabata et al.

It is certified that error appears in the above-identified patent and that said Letters Patent is hereby corrected as shown below:

In the specification

Column 6, line 53, change "speed $N_M$ of the input" to -- speed $N_{ATIN}$ of the input --.

Column 10, line 27, change "efficiency $T_{MC}$ of the" to -- efficiency $\eta_{MC}$ of the --.

Column 10, line 28, change "efficiency $T_{CVT}$ can be" to -- efficiency $\eta_{CVT}$ can be --.

Column 12, line 55, change "efficiency worm, i.e., total" to -- efficiency $\eta_{TOTAL}$, i.e., total --.

Column 13, line 2, change "engine efficiency $T_{ENG}$." to -- engine efficiency $\eta_{ENG}$. --.

Signed and Sealed this
Seventh Day of June, 2016

Michelle K. Lee
*Director of the United States Patent and Trademark Office*